US012810313B2

(12) United States Patent
Collen et al.

(10) Patent No.: US 12,810,313 B2
(45) Date of Patent: Nov. 24, 2026

(54) TOKEN GATING ACCESS

(71) Applicant: ENDSTATE AUTHENTIC LLC, West Roxbury, MA (US)

(72) Inventors: Bennett Collen, West Roxbury, MA (US); Matthew Michaud, Ashburnham, MA (US); Davis Wamola, Mountain View, CA (US)

(73) Assignee: ENDSTSTE AUTHENTIC LLC, West Roxbury, MA (US)

( * ) Notice: Subject to any disclaimer, the term of this patent is extended or adjusted under 35 U.S.C. 154(b) by 93 days.

(21) Appl. No.: 18/532,769

(22) Filed: Dec. 7, 2023

(65) Prior Publication Data

US 2024/0195619 A1 Jun. 13, 2024

Related U.S. Application Data

(60) Provisional application No. 63/430,975, filed on Dec. 7, 2022.

(51) Int. Cl.
*G06Q 30/018* (2023.01)
*G06Q 20/36* (2012.01)
(Continued)

(52) U.S. Cl.
CPC ......... *G06Q 30/0185* (2013.01); *G06Q 20/36* (2013.01); *G06Q 30/0613* (2013.01);
(Continued)

(58) Field of Classification Search
CPC ......... H04L 9/30; H04L 9/50; G06Q 30/0185; G06Q 30/0613
(Continued)

(56) References Cited

U.S. PATENT DOCUMENTS 10,438,290 B1 * 10/2019 Winklevoss ........ G06F 16/1815
10,853,592 B2 * 12/2020 Rodriguez ......... G06K 7/10297
(Continued)

FOREIGN PATENT DOCUMENTS

CN 111651731 A 9/2020

OTHER PUBLICATIONS

International Search Report and Written Opinion mailed Apr. 3, 2024 in corresponding International Application No. PCT/US2023/082993.

(Continued)

*Primary Examiner* — Dant B Shaifer Harriman
(74) *Attorney, Agent, or Firm* — Kevin M. Kercher

(57) ABSTRACT

A computer-implemented method for granting access. The method including receiving, from a computing device, an identifier identifying a physical object. The identifier is obtained by the computing device scanning a physical object and the physical object is linked to a digital asset. The method including receiving an encrypted message, wherein the encrypted message comprises an encrypted token. The method including determining the encrypted token satisfies a condition. The method including as a result of determining the condition is satisfied, transmitting an unencrypted public key of a wallet and the identifier to an application to use for granting access. Access is granted depending on whether the wallet owns the digital asset linked to the physical object.

14 Claims, 17 Drawing Sheets

(51) Int. Cl.
*G06Q 30/0601* (2023.01)
*H04L 9/00* (2022.01)
*G06K 7/10* (2006.01)
*G06K 19/07* (2006.01)

(52) U.S. Cl.
CPC ............ *H04L 9/50* (2022.05); *G06K 7/10297* (2013.01); *G06K 19/0723* (2013.01); *G06Q 2220/00* (2013.01)

(58) Field of Classification Search
USPC .......................................................... 713/171
See application file for complete search history.

(56) References Cited

U.S. PATENT DOCUMENTS

| | | | |
|---|---|---|---|
| 10,977,456 | B1 | 4/2021 | Davis |
| 11,113,754 | B2 * | 9/2021 | Andon .................. H04L 9/0643 |
| 11,348,152 | B1 * | 5/2022 | Davis ................. G06Q 30/0601 |
| 11,475,494 | B1 | 10/2022 | Davis |
| 11,790,418 | B1 | 10/2023 | Jay et al. |
| 12,277,562 | B1 | 4/2025 | Medure et al. |
| 2010/0181377 | A1 | 7/2010 | Chen et al. |
| 2017/0270324 | A1 | 9/2017 | Younger et al. |
| 2018/0062835 | A1 * | 3/2018 | Hamel .................. H04L 9/0822 |
| 2019/0102756 | A1 | 4/2019 | Zhou et al. |
| 2019/0303921 | A1 * | 10/2019 | Mutter ............... G06Q 20/3829 |
| 2019/0305943 | A1 * | 10/2019 | Hoersten ................... H04L 9/14 |
| 2021/0103938 | A1 | 4/2021 | Bulawski et al. |
| 2021/0248653 | A1 | 8/2021 | McKenzie et al. |
| 2022/0207119 | A1 | 6/2022 | Andon et al. |
| 2022/0294630 | A1 | 9/2022 | Collen |
| 2022/0309491 | A1 | 9/2022 | Shapiro et al. |
| 2023/0010172 | A1 * | 1/2023 | Myers ..................... G06F 1/163 |
| 2023/0034169 | A1 * | 2/2023 | Ferenczi ............... H04L 9/0894 |
| 2023/0070389 | A1 * | 3/2023 | Madhusudhan ..... G06Q 10/083 |
| 2023/0119584 | A1 * | 4/2023 | Quigley ............. G06Q 20/3672 705/65 |
| 2023/0131380 | A1 | 4/2023 | Sandu |
| 2023/0196341 | A1 * | 6/2023 | Quigley ............. G06Q 20/3672 705/65 |
| 2023/0246836 | A1 * | 8/2023 | Wentker .............. G06F 21/1014 713/159 |
| 2023/0334472 | A1 * | 10/2023 | Pene ...................... G06Q 20/10 |
| 2024/0005354 | A1 * | 1/2024 | Rush .................. G06Q 30/0226 |
| 2024/0096070 | A1 * | 3/2024 | Figge ................. G06V 10/7747 |
| 2024/0171393 | A1 * | 5/2024 | Bathen .................. H04L 9/0825 |
| 2024/0330891 | A1 * | 10/2024 | Pistone .............. G06Q 20/1235 |
| 2024/0354757 | A1 * | 10/2024 | Pirseyedi ............. G06Q 20/389 |
| 2024/0412175 | A1 * | 12/2024 | Kurani ............... G06Q 20/0655 |
| 2025/0055713 | A1 * | 2/2025 | Theeg ..................... H04L 63/12 |
| 2026/0039461 | A1 * | 2/2026 | Andon .................. H04L 9/0643 |

OTHER PUBLICATIONS

International Search Report and Written Opinion mailed Apr. 9, 2024 in corresponding International Application No. PCT/US23/82996 (10 pages).

Ferro, et al., "Digital assets rights management through smart legal contracts and smart contracts", Blockchain: Research and Applications 4.3 (2023): 100142 (10 pages).

* cited by examiner

TOKEN GATING ACCESS

CROSS REFERENCE TO RELATED APPLICATIONS

This application claims priority to U.S. provisional application Ser. No. 63/430,975, filed on Dec. 7, 2022. The entire contents of the above identified application is incorporated herein by reference as if fully set forth herein.

TECHNICAL FIELD

Disclosed are embodiments related to digital assets, physical assets, and methods and apparatuses for associating the digital assets with the physical assets, claiming the digital assets, and granting access based on the digital and physical assets. More particularly, this disclosure relates to computer-implemented methods and apparatuses for associating a digital asset, such as, for example, a non-fungible token ("NFT"), with a near-field communication ("NFC") chip, claiming a digital asset linked with a NFC chip, and granting access based on the digital asset and/or NFC chip.

BACKGROUND

A new breed of entrepreneur has emerged. Creators of all persuasions—entertainers, athletes, artists, gamers—have massive audiences who crave authentic interaction and engagement with the creators they adore. Historically, these creators have had limited options for engaging and monetizing their fanbases, and their fans have had limited options to support and signal their affiliation with the creators.

Digital assets, such as cryptographic ("Crypto") tokens, like non-fungible tokens ("NFTs"), have emerged to help fill the gap. Crypto assets help align incentives amongst creators and their fans as creators can sell digital assets directly to fans. For example, a professional athlete may release a digital asset collection highlighting the greatest moments of their career. Another way for creators to interact with fans is to sell physical objects associated with their image. For example, the same athlete may release a sneaker line with a sportswear brand. Fans of the athlete may purchase both the digital asset and a pair of sneakers to display their fandom.

SUMMARY

NFTs represent an exciting evolution in asset ownership in digital environments. They allow fans to own unique digital assets of their favorite creators. Current approaches, however, limit the potential of NFTs to the digital world. As each NFT is unique and verifiable on the blockchain, they have potential to use their authority in the physical world as well. As such, a novel technique is required to effectively link and utilize NFTs with physical objects.

Some embodiments disclosed herein allow users to associate a digital asset with a near-field communication ("NFC") chip. The NFC chip may be embedded within a physical object. The NFC chip provides a way to link the digital asset with the physical object. In an exemplary embodiment, a user may receive a ###pre-encoded uniform resource locator ("URL") by scanning the NFC chip with a computing device. The user may select a digital asset and use the pre-encoded URL to associate the digital asset with the NFC chip.

Some embodiments disclosed herein allow a user to claim a digital asset linked with a NFC chip. A computing device may receive a request to claim a digital asset in response to a user scanning the NFC chip with their user device, such as, a cellular device, mobile phone, and the like. The computing device may identify if the digital asset is available by comparing the current owner of the digital asset with the original entity which minted the digital asset. If the two are the same, then the digital asset is available to be claimed by the user.

Some embodiments disclosed herein grant access based on ownership of a digital asset and/or a NFC chip. In an exemplary embodiment, a user may be granted access to an event if they can show they own a digital asset and/or a physical object (i.e., physical asset) with an NFC chip that is part of a specific collection. The user may connect their crypto wallet and/or scan the NFC chip to show ownership.

An advantage of embodiments disclosed herein is that they provide an efficient method for utilizing the benefits of digital assets in the physical world. By associating a digital asset with a physical object, a user may easily validate the authenticity of the physical object. Counterfeit goods may easily be identified and dismissed as they will not include an NFC chip linked with a correct digital asset.

Another advantage of embodiments disclosed herein is a reliable method of gatekeeping access. Since ownership of a physical object linked with a digital asset cannot be forged, ownership of the object and/or digital asset may provide an efficient way to grant access, for example, to an event, or to exclusive content. A user determining whether to grant access can be assured only persons on a list, those that own a digital asset and/or a physical object with a NFC chip, will be allowed.

According to a first aspect, a computer-implemented method for associating a digital asset with a physical object. The method includes selecting a record associated with the digital asset. The method includes receiving a unique identifier associated with the physical object. The unique identifier is obtained by scanning the physical object. The method includes transmitting a request message. The request message comprises the unique identifier and data associated with the digital asset.

In some embodiments, the unique identifier is a pre-encoded uniform resource locator (url).

In some embodiments, the physical object includes a near-field communication (NFC) chip and the unique identifier is obtained by scanning the NFC chip of the physical object.

In some embodiments, selecting the record comprises selecting the record from a list displayed on a graphical display.

In some embodiments, the digital asset is not associated with any physical object.

In some embodiments, the request message comprises an indication to associate the digital asset with the physical object.

In some embodiments, the record describes the physical object.

In some embodiments, the digital asset includes a cryptographic token.

In some embodiments, the cryptographic token is a non-fungible token (NFT).

In some embodiments, the physical object is one or more of: footwear, apparel, art, equipment, an event ticket, and a functional asset.

According to a second aspect, a computing device is provided. The computing device includes processing circuitry and a memory containing instructions executable by the processing circuitry for associating a digital asset with a physical object. The computing device is operative to select a record associated with the digital asset. The computing device is operative to receive a unique identifier associated with the physical object. The unique identifier is obtained by scanning the physical object. The computing device is operative to transmit a request message. The request message comprises the unique identifier and data associated with the digital asset.

According to a third aspect, a computer-implemented method for claiming a digital asset linked with a physical object. The method includes receiving, from a computing device, an identifier identifying the physical object. The identifier is obtained by the computing device scanning the physical object. The method includes identifying the digital asset associated with the physical object. The method includes determining whether a wallet identifier associated with a wallet that owns the digital asset matches an initial wallet identifier. The initial wallet identifier is associated with minting the digital asset.

In some embodiments, the physical object includes a near-field communication (NFC) chip and the identifier is obtained by the computing device scanning the NFC chip of the physical object.

In some embodiments, the method includes as a result of determining the wallet identifier associated with the digital asset does not match the initial wallet identifier, directing a user of the computing device to a verification webpage; receiving a user wallet identifier; and determining whether the user wallet identifier matches the wallet identifier associated with a wallet that owns the digital asset.

In some embodiments, the method includes as a result of determining the wallet identifier associated with the digital asset matches the initial wallet identifier, obtaining an encrypted token; and transmitting the encrypted token to the computing device.

In some embodiments, the encrypted token comprises one or more of: a digital asset identifier associated with the digital asset, a group identifier associated with the digital asset, and a time identifier.

In some embodiments, the encrypted token comprises a success uniform resource locator (url) redirect and/or a NFC chip serial number associated with the physical object.

In some embodiments, the method includes receiving a claiming message. The claiming message comprises a key associated with a wallet and the encrypted token.

In some embodiments, the method includes determining the time identifier has not expired; and transferring the digital asset to the wallet of the user.

In some embodiments, the method includes receiving a payment identifier associated with the physical object.

In some embodiments, the digital asset is transferred after receiving the payment identifier.

In some embodiments, the digital asset includes a cryptographic token.

In some embodiments, the cryptographic token is a non-fungible token (NFT).

According to a fourth aspect, a computing device is provided. The computing device includes processing circuitry and a memory containing instructions executable by the processing circuitry for claiming a digital asset linked with a physical object. The computing device is operative to receive, from a computing device, an identifier identifying the physical object. The identifier is obtained by the computing device scanning the physical object. The computing device is operative to identify the digital asset associated with the physical object. The computing device is operative to determine whether a wallet identifier associated with a wallet that owns the digital asset matches an initial wallet identifier, wherein the initial wallet identifier is associated with minting the digital asset.

According to a fifth aspect, a computer-implemented method for granting access. The method includes receiving, from a computing device, an identifier identifying a physical object. The identifier is obtained by the computing device scanning a physical object and the physical object is linked to a digital asset. The method includes receiving an encrypted message, wherein the encrypted message comprises an encrypted token. The method includes determining the encrypted token satisfies a condition. The method includes, as a result of determining the condition is satisfied, transmitting an unencrypted public key of a wallet and the identifier to an application to use for granting access. Access is granted depending on whether the wallet owns the digital asset linked to the physical object.

In some embodiments, the physical object includes a near-field communication (NFC) chip and the identifier is obtained by the computing device scanning the NFC chip of the physical object.

In some embodiments, determining the encrypted token satisfies the condition comprises: determining that the encrypted token is able to be decrypted; or determining a time identifier associated with the encrypted token has not expired.

In some embodiments, the method includes receiving a key message, wherein the key message includes the public key; encrypting the public key into the encrypted token, wherein the encrypted token comprises a time identifier and an unique identifier key; and storing an initialization vector of the encrypted token into a memory cache.

In some embodiments, the method includes transmitting the encrypted token to a browser, wherein the encrypted token is displayed to a user as a QR code.

In some embodiments, the encrypted message is received as a result of the user scanning the QR code.

In some embodiments, access is granted depending on ownership of the physical object.

According to a sixth aspect, a computing device is provided. The computing device includes processing circuitry and a memory containing instructions executable by the processing circuitry for granting access. The computing device is operative to receive, from a computing device, an identifier identifying a physical object. The identifier is obtained by the computing device scanning a physical object and the physical object is linked to a digital asset. The computing device is operative to receive an encrypted message. The encrypted message comprises an encrypted token. The computing device is operative to determine the encrypted token satisfies a condition. The computing device is operative to, as a result of determining the condition is satisfied, transmit an unencrypted public key of a wallet and the identifier to an application to use for granting access. Access is granted depending on whether the wallet owns the digital asset linked to the physical object.

According to a seventh aspect, a computer program product is provided comprising a non-transitory computer readable medium storing a computer program comprising instructions which, when executed by processing circuitry, causes the processing circuitry to carry out the methods of any one of the embodiments of the first, third, and fifth aspects.

According to an eighth aspect, an apparatus is provided. The apparatus includes a memory and processing circuitry coupled to the memory, wherein the apparatus is configured to perform the methods of any one of the embodiments of the first, third, and fifth aspects.

BRIEF DESCRIPTION OF THE DRAWINGS

The accompanying drawings, which are incorporated herein and form part of the specification, illustrate various embodiments.

DETAILED DESCRIPTION

Figure 1:
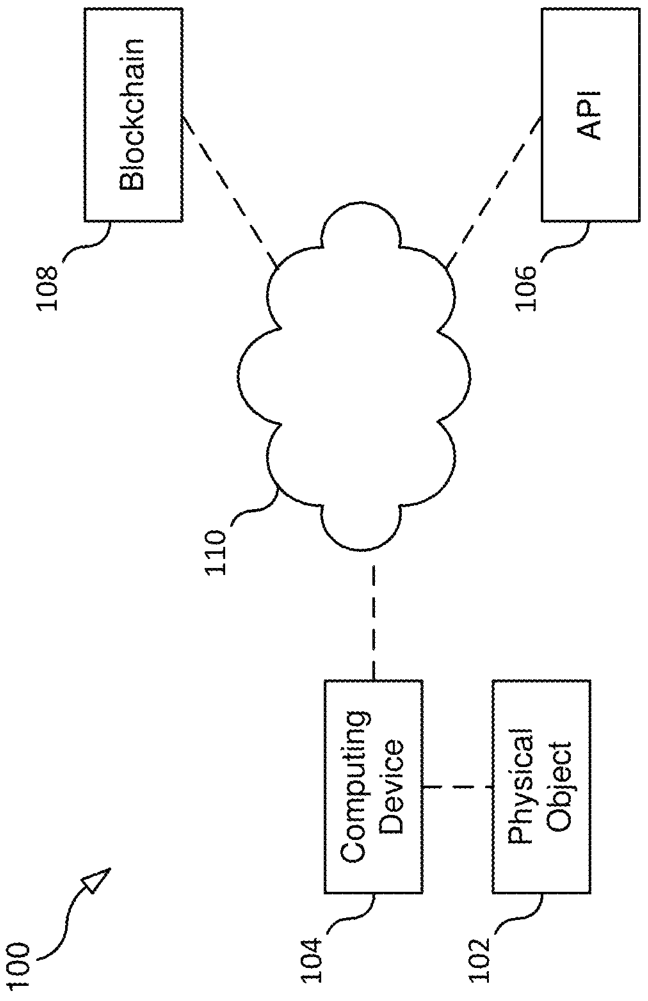
FIG. 1 is a block diagram illustrating an architecture according to some embodiments.

FIG. 1 is a block diagram illustrating an architecture according to some embodiments. A physical object 102 (e.g., footwear, such as a pair of sneakers, apparel, art, equipment, an event ticket, or a functional asset) may include an NFC chip. The NFC chip may be embedded within physical object 102 or attached to physical object 102. The NFC chip may be embodied as a silicon component or integrated circuit and configured to communicate with a computing device 104. Computing device 104 may include an antenna which is configured to communicate with the NFC chip of physical object 102.

Physical object 102, more specifically the NFC chip, may be linked to a digital asset on a blockchain 108. The digital asset may be embodied as a cryptographic token, like an NFT. In some embodiments, computing device 104 may be used to establish the link between the NFC chip and the digital asset. Computing device 104 may be configured to communicate with an application programming interface ("API") 106 utilizing a network 110 (e.g., the internet) to establish the link. API 106 may send computing device 104 a list of available digital assets. Computing device 104 may respond to API 106 with a digital asset selection from the list and an encoded uniform resource locator ("URL") obtained from the NFC chip. API 106 may then communicate the linked association between the NFC chip and the digital asset to a blockchain 108 utilizing network 110.

In some embodiments, computing device 104 may be configured to claim the digital asset for a user. For example, the user may purchase physical object 102 and included in the purchase is the linked digital asset. To obtain the digital asset, the user may request API 106 transition ownership of the digital asset on blockchain 108 to their crypto wallet. A crypto wallet being a self-custodied digital wallet used to store and manage digital assets such as cryptocurrencies and NFTs. The user may first be required to prove ownership of the physical object 102 by scanning the NFC chip with computing device 104.

In some embodiments, a user may be granted access by proving ownership of physical object 102 and/or its linked digital asset. To prove ownership of the digital asset, the user may connect their wallet containing the digital asset with API 106. API 106 may compare the wallet's address with the address listed on blockchain 108 as the owner of the digital asset. If the two addresses are the same, then the user has successfully shown ownership of the digital asset. The user may show ownership physical object 102 may by scanning its NFC chip with computing device 104.

Associating NFC Chips with Digital Assets

Increasingly, physical goods (i.e., assets or objects) come with corresponding digital counterparts—digital versions of the good, digital certificates of authenticity, etc. In order to link a physical good with its digital counterpart (and vice versa), a unique identifier may be attached to the physical item. Often, this takes the form of a scannable chip (e.g., NFC chip), which is programmed to be linked to the corresponding digital asset (e.g., NFT). In some embodiments, there may be a 1:1 relationship between the physical item, and its corresponding chip, and the digital asset.

In some embodiments, the scannable chip, NFC chip, may not be pre-encoded and may support the writing of data. Here, a user may use an application with the ability to write data to the NFC chip. When an order is created, such as with a purchase on an e-commerce website or a redemption of a digital asset for the physical counterpart, a unique URL may be generated and used for encoding to a blank NFC chip. This URL is the link between the physical and digital assets. The digital asset is linked to the order and the URL, which is encoded to the physical item.

The user may also have the ability to lock NFC chips. By locking the NFC chip, any tampering or rewriting of the data on the chip may be prevented.

Figure 2:
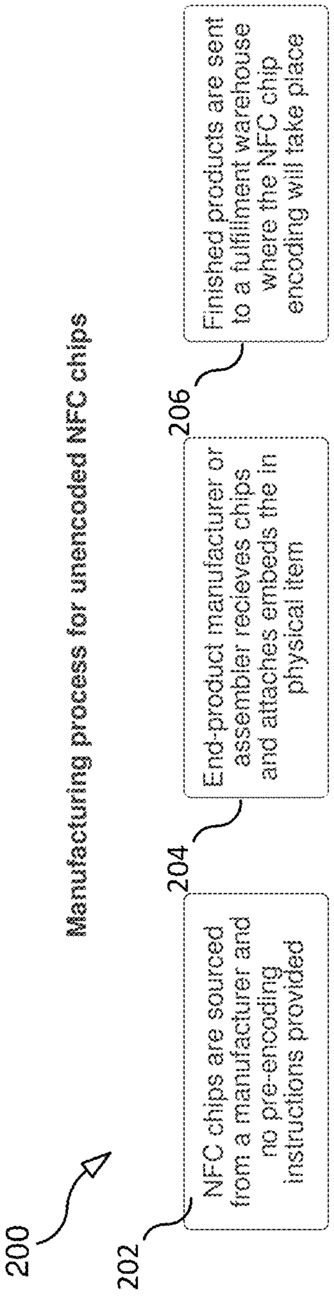
FIG. 2 is a block diagram illustrating a manufacturing process for unencoded NFC chips according to some embodiments.

FIG. 2 is a block diagram illustrating a manufacturing process for unencoded NFC chips according to some embodiments. Process 200 may begin at step 202.

At 202, a NFC chip may be sourced from a manufacturer and the manufacturer may not provide any pre-encoding instructions. At 204, an end product manufacturer or assembler may receive the NFC chip and may attach or embed the NFC chip into a physical object. At 206, the finished product, the physical object with the NFC chip, may be sent to a fulfillment warehouse where the NFC chip encoding may take place.

Figure 3:
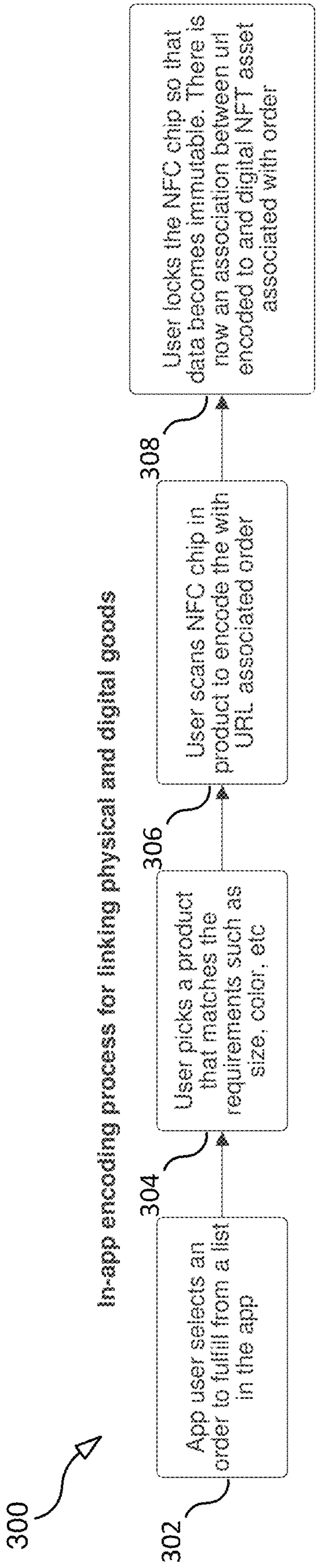
FIG. 3 is a block diagram illustrating an in-app encoding process for linking physical and digital goods according to some embodiments.

FIG. 3 is a block diagram illustrating an in-app encoding process for linking physical and digital goods according to some embodiments. Process 300 may being with step 302.

At 302, an app user may select an order to fulfill from a list in an application. Each order may include a description of a physical object and a digital asset. In some embodiments, the computing device may be an android or apple smart phone.

At 304, the user may pick physical object that matches the description of the physical object from the selected order. For example, the user may select physical object that is a same size and color as the description of the physical object.

At 306, the user may scan the NFC chip in the product to encode the URL associated with the NFC chip with a digital asset. In some embodiments, this creates a 1:1 link between the NFC chip and the digital asset on the blockchain. At 308, the user may lock the NFC chip so that the data becomes immutable. At this point, there is an association between the URL encoded into the NFC chip and the digital asset.

Figure 4:
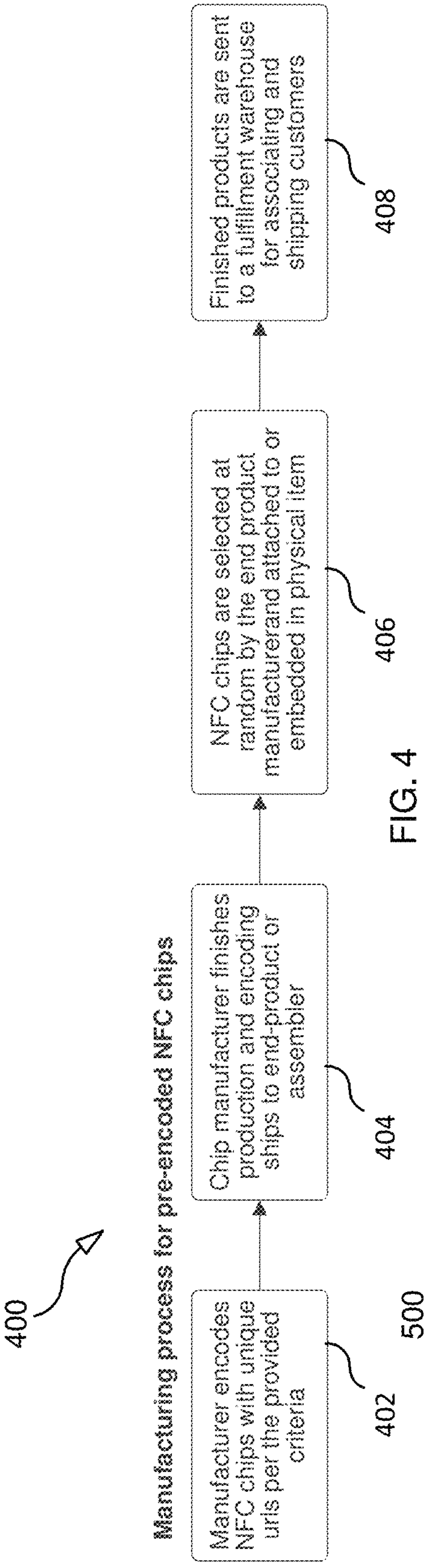
FIG. 4 is a block diagram illustrating a manufacturing process for pre-encoded NFC chips according to some embodiments.

FIG. 4 is a block diagram illustrating a manufacturing process for pre-encoded NFC chips according to some embodiments. Process 400 may begin with step 402.

At 402, a manufacturer may encode NFC chips with unique URLs according to a provided criteria. At 404, the manufacturer may finish the production and encoding process and ship the NFC chips to end-product manufacturers or assemblers. At 406, the NFC chips may be selected at random by the end product manufacturers. The end product manufacturers may attach the NFC chips to a physical object or embed the NFC chips into the physical objects. At 408, the finished products may be sent to a fulfillment warehouse for associating and shipping to customers.

Figure 5:
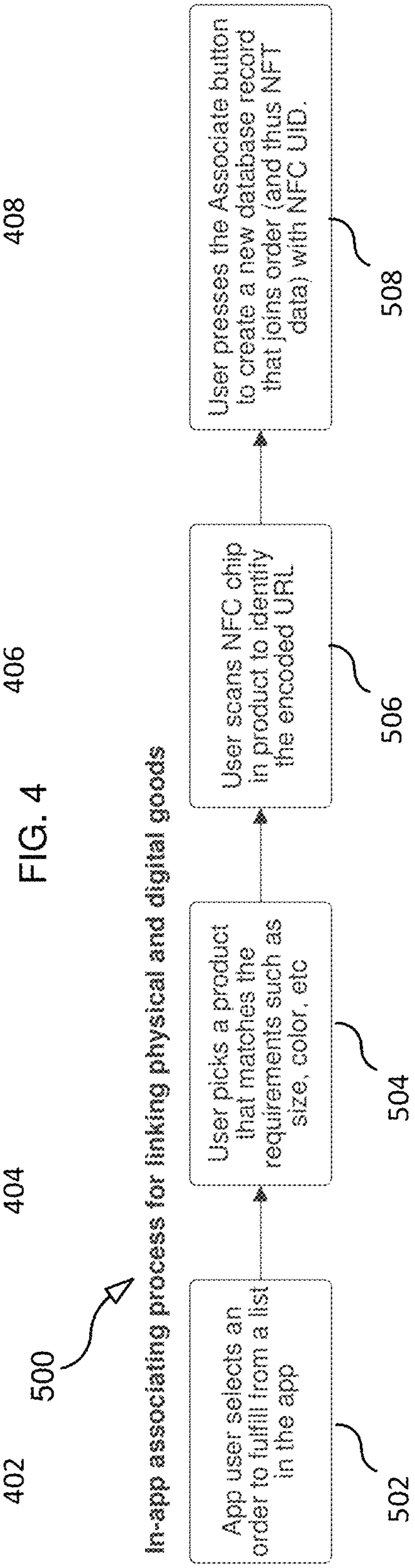
FIG. 5 is a block diagram illustrating an in-app associating process for linking physical and digital goods according to some embodiments.

FIG. 5 is a block diagram illustrating an in-app associating process for linking physical and digital goods according to some embodiments. Process 500 may begin with step 502.

At 502, a user may select an order to fulfill from a list in an application. Each order may include a description of a physical object and a digital asset. At 504, the user may pick a physical object that matches the description of the physical object. For example, the user may select a physical object from the list that is a same size and color as the physical object.

At 506, the user may scan the NFC chip in the physical object to identify the encoded URL. At 508, the user may press an associate button to create a new database record that joins the digital asset with the NFC unique identifier (e.g., URL).

Figure 6:
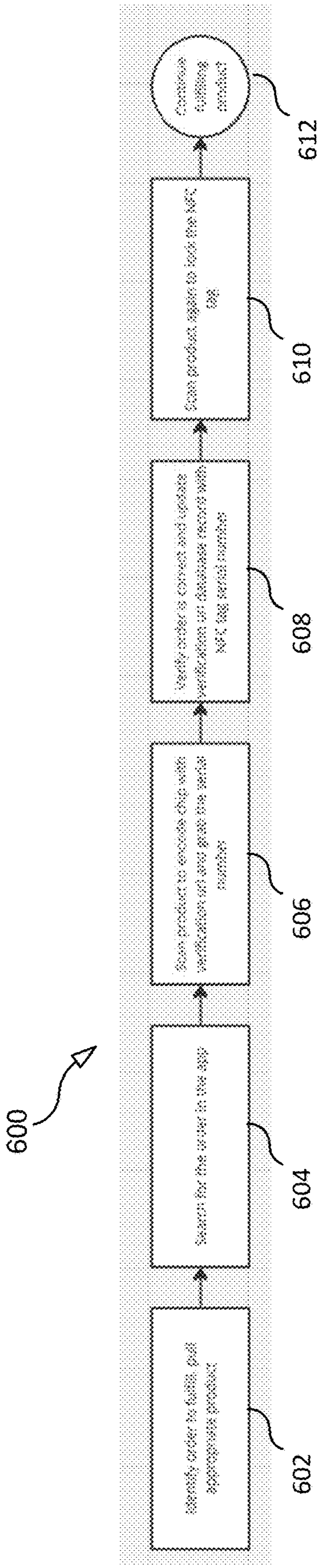
FIG. 6 is a block diagram illustrating a process for linking physical and digital assets, according to some embodiments.

FIG. 6 is a block diagram illustrating a process for linking physical and digital assets according to some embodiments. Process 600 may begin with step 602. At 602, a user may identify an order to fulfill and pull the appropriate product. At 604, the user may search for the order in an application. In some embodiments, the user may search for the order on a computing device, such as, an android or apple smart phone.

Before a product is fulfilled to a customer, the user/fulfillment person may use the application to search for orders in an order management system via a marketplace API. When the application is opened, a list of orders with their order ID and corresponding verification URLs is fetched from the marketplace API and stored locally on the device. Orders may be presented in a list format, identified by the order number, and are matched 1:1 with the corresponding verification URL of the digital asset owned by the customer (e.g., the information about the corresponding asset to the physical item). In some embodiments, this information is pulled from the marketplace API, and will take the form of a verification URL. When the user taps an order from the list they may navigate to a new page that shows the order information, the verification URL, and has buttons for reading and associating the NFC chip with the order.

At 606, the user may scan the product to encode the chip with a verification URL and obtain the serial number. The user may press a "read" button and holds the NFC chip close to the device which scans the product to be fulfilled. This reads the data on the NFC tag and pulls the serial ID of the NFC tag affixed to (or associated with) the physical product.

At 608, the user may verify the order is correct and update a verification URL database record with the NFC tag serial number. The user presses the Set Serial Number button which uploads the serial ID to the marketplace servers and stores the ID in a database with the verification URL to be encoded to the chip. The user may then press an "associate" button and scans the product again to associate the URL encoded to the NFC chip with the digital asset for the given order.

At 610, the user may scan the product again to lock the NFC tag. In some embodiments, the NFC tag will not be pre-encoded and will have to be encoded at time of fulfillment. Here, the user will have to encode the NFC tag with the URL associated with the order being fulfilled. The user may press an 'encode' button to write the URL to the chip. The user then visually confirms that the encoded data is correct and locks the NFC tag. The size of the ordered product should match the size of the physical product and the order name should match the NFT owner name. The user presses the 'lock' button then scans the NFC tag again to lock it.

At 612, the user may continue fulfilling the product. With the NFC tag properly associated, the product is ready to be fulfilled for the order.

Figure 7:
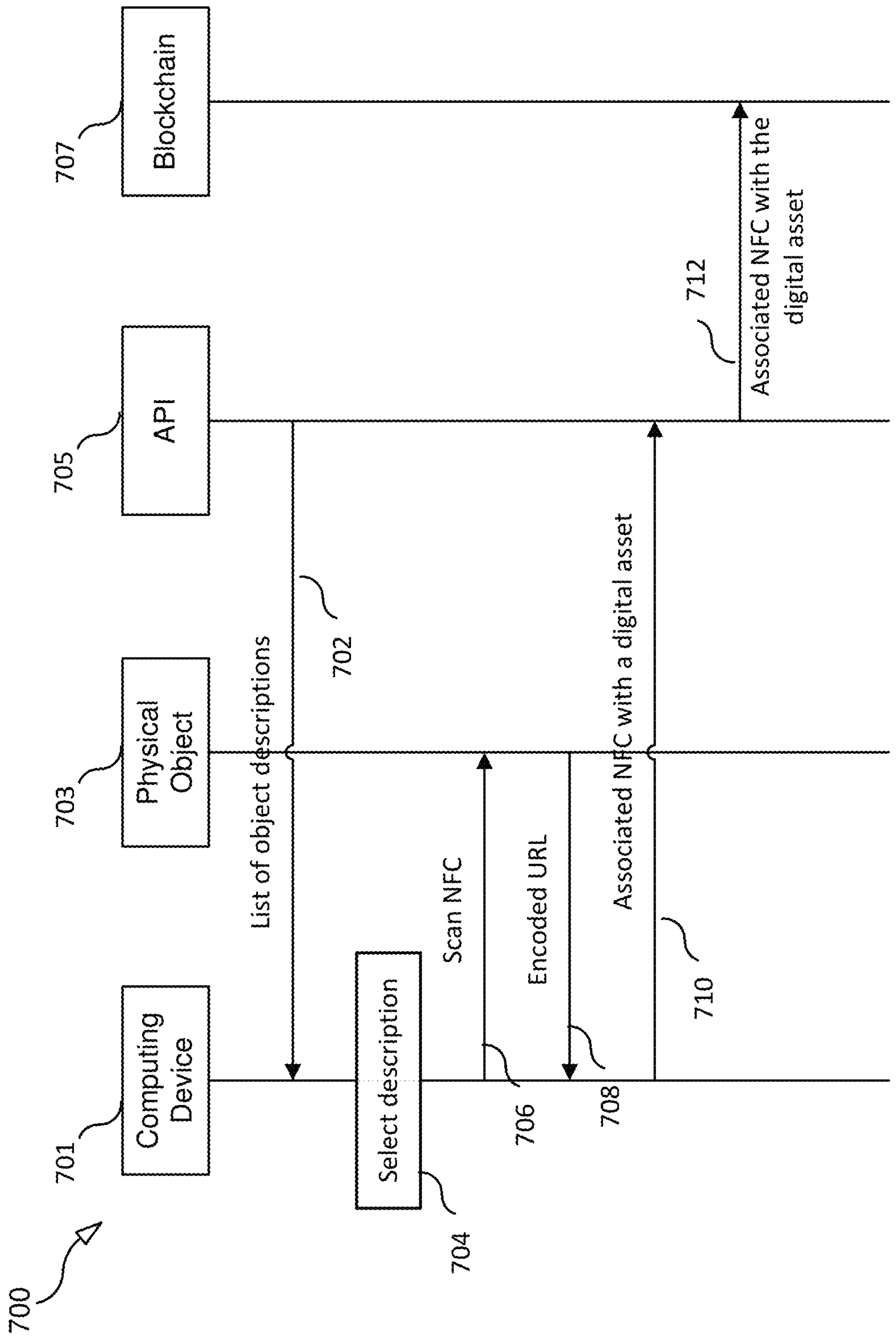
FIG. 7 is a sequence diagram illustrating a method for associating a NFC chip with a digital asset according to some embodiments.

FIG. 7 is a sequence diagram illustrating a method for associating a NFC chip with a digital asset according to some embodiments. To associate a digital asset with a physical item, a pre-encoded NFC chip may to be associated with a database record which references a digital asset on the blockchain. Method 700 may begin with step 702.

At 702, API 705 may provide a list of object descriptions to a computing device 701. The list of object descriptions may include a description of the object (e.g., size, color, and pattern) and an associated digital asset. In some embodiments, the digital assets may be pre-minted and stored on a blockchain. In some embodiments, the computing device may be embodied as an android or apple smart phone.

The application on computing device 701 may have the ability to load order data from API 705 and save it in local persistent memory. By having this order data pre-downloaded, before fulfillment has begun, there is less risk of work stoppage due to network latency or data unavailability. Orders may be presented in a list per drop and are accessed by the user when they tap on a drop button on the main screen. A drop being a group of physical objects and digital assets. In some embodiments, orders represent e-commerce orders placed through a web store or represent individual items in a product that were bulk ordered. Orders may or may not indicate a size or other detail of a product, and may be linked 1 to 1 with a digital asset.

If no order data has been downloaded, the user must first download the order data by tapping the refresh icon on the drop they are fulfilling for in the main screen. Once the data is downloaded, the user then taps the drop to go to the order screen.

At 704, the user of computer device 701 may select an object description from the list. The user may select the object description using a graphical display provided by computer device 701. By selecting an object description, the user is also selecting a digital asset. The user may select an object description based on the description matching a physical object 703.

The user may press Associate and may be taken to an Associate screen. Here, the user may use computing device 701 to scan the target NFC chip. This reads the chip and saves the pre-encoded URL in local memory. At 706, the user may scan the NFC chip of physical object 703 with computing device 701. The NFC chip of physical object 703 may respond with an encoded URL at 708.

At 710, computing device 701 may transmit an association message to API 705 to associate the NFC chip with the digital asset. In some embodiments, by pressing an Associate button which makes a network request to API 705 with the scanned URL and the digital asset data to be associated. At 712, the API may associate the NFC chip with the digital asset on a blockchain 707. API 705 may take the scanned URL and decodes it to receive the UID of the chip. This UID may then inserted into a database, such as blockchain 709, along with the digital asset data, thus creating an association between the NFC chip and the digital asset. Lastly, the user may press Mark Done which flags the digital asset as associated, preventing duplicate associations.

Figure 8:
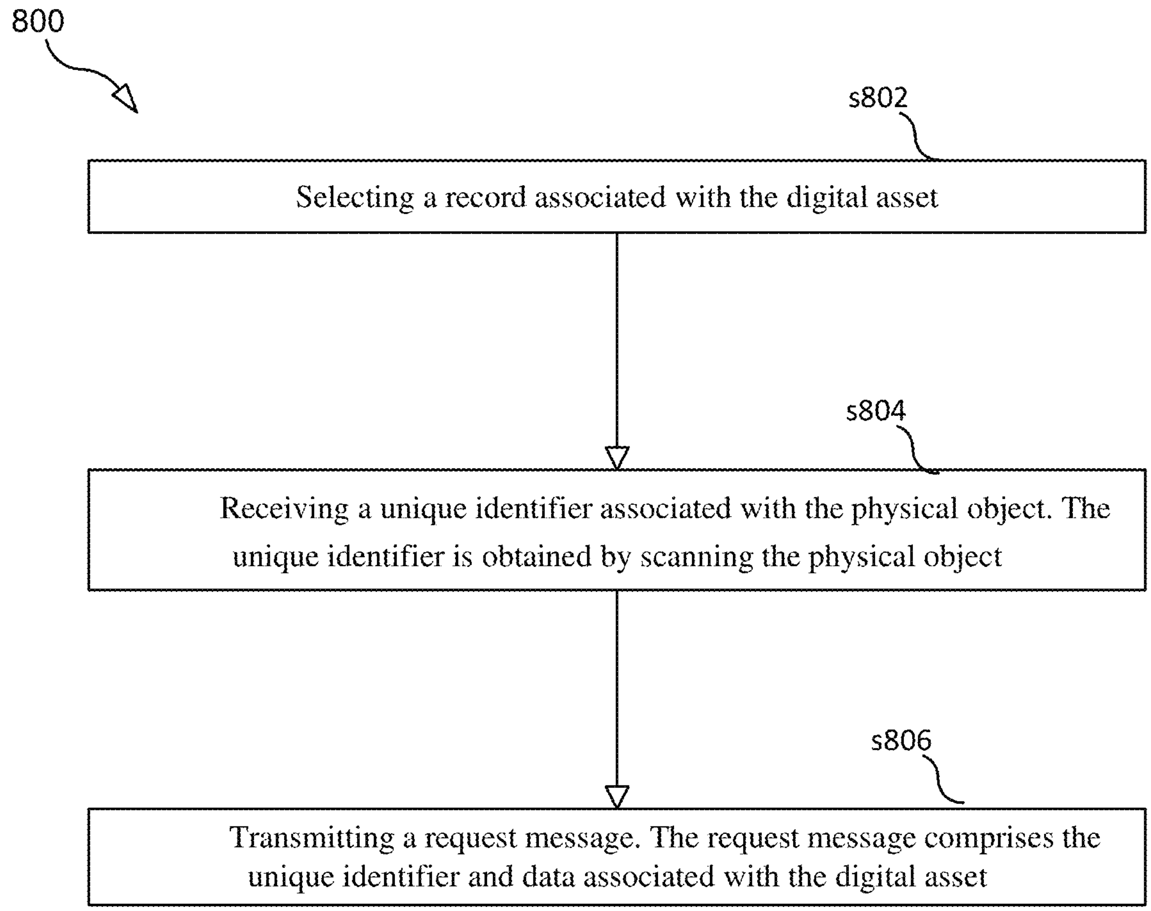
FIG. 8 is a flow chart illustrating a process according to some embodiments.

FIG. 8 is a flow chart illustrating a process according to some embodiments.

Process 800 is a computer-implemented method for associating a digital asset with a physical object. Referring now to FIG. 8, process 800 may begin with step s802.

Step s802 comprises selecting a record associated with the digital asset.

Step s804 comprises receiving a unique identifier associated with the physical object. The unique identifier is obtained by scanning the physical object.

Step s806 comprises transmitting a request message. The request message comprises the unique identifier and data associated with the digital asset.

In some embodiments, the unique identifier is a pre-encoded uniform resource locator (url). In some embodiments, the physical object includes a near-field communication (NFC) chip and the unique identifier is obtained by scanning the NFC chip of the physical object. In some embodiments, selecting the record comprises selecting the record from a list displayed on a graphical display. In some embodiments, the digital asset is not associated with any physical object. In some embodiments, the request message comprises an indication to associate the digital asset with the physical object. In some embodiments, the record describes the physical object. In some embodiments, the digital asset includes a cryptographic token. In some embodiments, the cryptographic token is a non-fungible token (NFT). In some embodiments, the physical object is one or more of: footwear, apparel, art, equipment, an event ticket, and a functional asset.

In Person NFT Claim

In some embodiments, NFC chips, which have been pre-encoded and embedded or attached to physical goods, may act as a link to a corresponding digital asset. The digital assets may be pre-minted and the NFC chips may be programmed to link to one digital asset in a series. A user may claim the digital asset that corresponds to the physical object by scanning the NFC chip contained in the physical object. Having possession of the physical object may entitle the owner to take possession of the digital component, which they are able to do by scanning the embedded or attached NFC chip with an NFC reading capable device, such as an android or apple device.

NFC chips may be embodied as thin integrated circuits that enable two way communication between two devices, one being the circuit and one being a device which is capable of transmitting radio waves. The radio waves power the circuit to read and write data from the circuit. In some embodiments the NFC chips may be embedded in the physical object, such as in the tag on a tongue of a sneaker, or in a silicone label heat pressed onto a t-shirt, sweatshirt, or bag.

Most consumer grade mobile phones have NFC capabilities. The mobile phone may have a radio antenna on the rear or top of the mobile phone which is capable of automatically detecting and reading NFC chips when they are in close proximity (e.g., less than 4 cm) away from the NFC chip.

Figure 9:
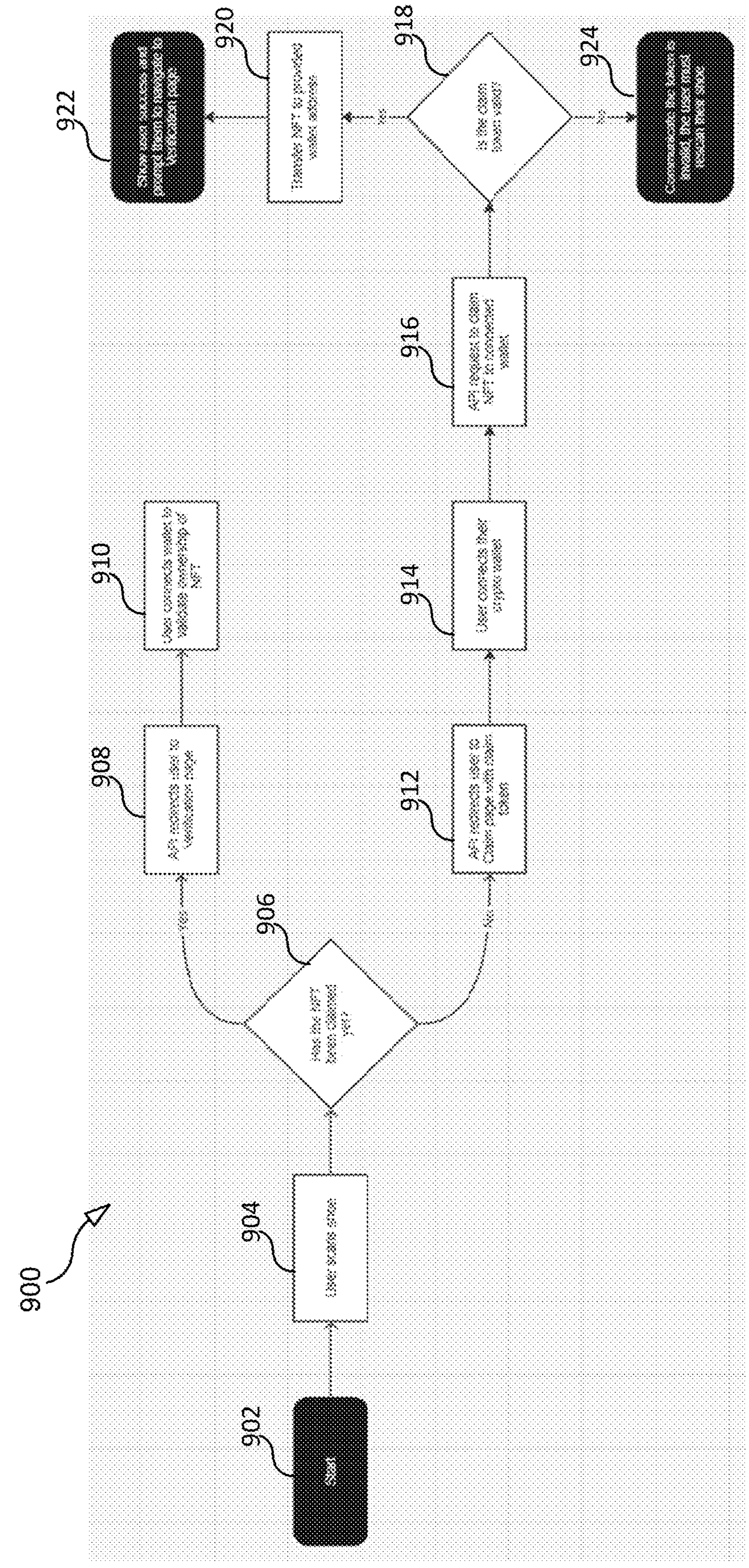
FIG. 9 is a block diagram illustrating a process for claiming a digital asset linked with a NFC chip according to some embodiments.

When a user purchases a physical good connected to a digital asset, the user is able to claim the digital asset corresponding to the physical item after the physical item has been taken into the user's possession FIG. 9 is a block diagram illustrating a process for claiming a digital asset linked with a NFC chip according to some embodiments. Process 900 may begin with step 902.

At 902, a user may begin the process for claiming the digital asset linked with the NFC chip. At 904, the user may scan the NFC chip within a physical object. The physical object may be embodied as a pair of sneakers. The user may perform the scan with a computing device.

In some embodiments, the user may identify the physical object through the use of a mobile device, such as an android or apple phone, by scanning the item, optically identifying the item or component of the item, or any other form of scanning or identifying the item. Scanning may be done utilizing any technology, such as, NFC, quick response ("QR"), radio frequency identification ("RFID), and optical scans. Successful identification may open a verification website or application that would then display the physical item's corresponding linked digital asset.

At 906, an API may receive a request to claim the digital asset and determine whether the digital asset has already been claimed. The digital asset may be embodied as an NFT. A website or application may determine whether the digital asset corresponding to the physical object has been claimed. To do so, it may make a network request to a backend service which finds the owner of the digital asset by calling a function on the blockchain smart contract called 'ownerOf' with the token id of the digital asset. ownerOf may be a smart contract function defined in the ERC 721 smart contract which looks up the owner of a given tokenId.

It then compares this address against the known custodial wallet address used to mint the digital asset initially. If the two addresses are the same, then the digital asset has not yet been claimed.

If the digital asset has already been claimed, process 900 may proceed to step 908. At 908, the API may redirect the user to a verification page. In the event that the digital asset is already claimed, meaning that the owner of the digital asset does not match the custodial wallet address, the site or application may redirect the user to the verification page. The verification page allows the user to verify their ownership of the digital asset by connecting their wallet and confirming that the connected wallet owns the digital asset.

At 910, the user may connect their crypto wallet to the verification page to validate ownership of the NFT. Verification is a process where the owner of a physical object with an embedded NFC chip scans the chip and reviews details about the digital asset that is connected to the NFC chip. Here, the user is able to connect their crypto wallet to prove they own, or do not own, the digital asset companion to the physical object.

In some embodiments, verification may include a user scanning the NFC chip on the physical object using a mobile device. The URL on the chip is opened in a web browser. This URL may be a unique tiny URL. The tiny URL may be processed by a backend service which redirects a web browser to a website with a token containing information about the digital asset connected to the physical item. The webpage shows details to the user and also allows them to connect their wallet to prove ownership of the digital asset.

Figure 11A:
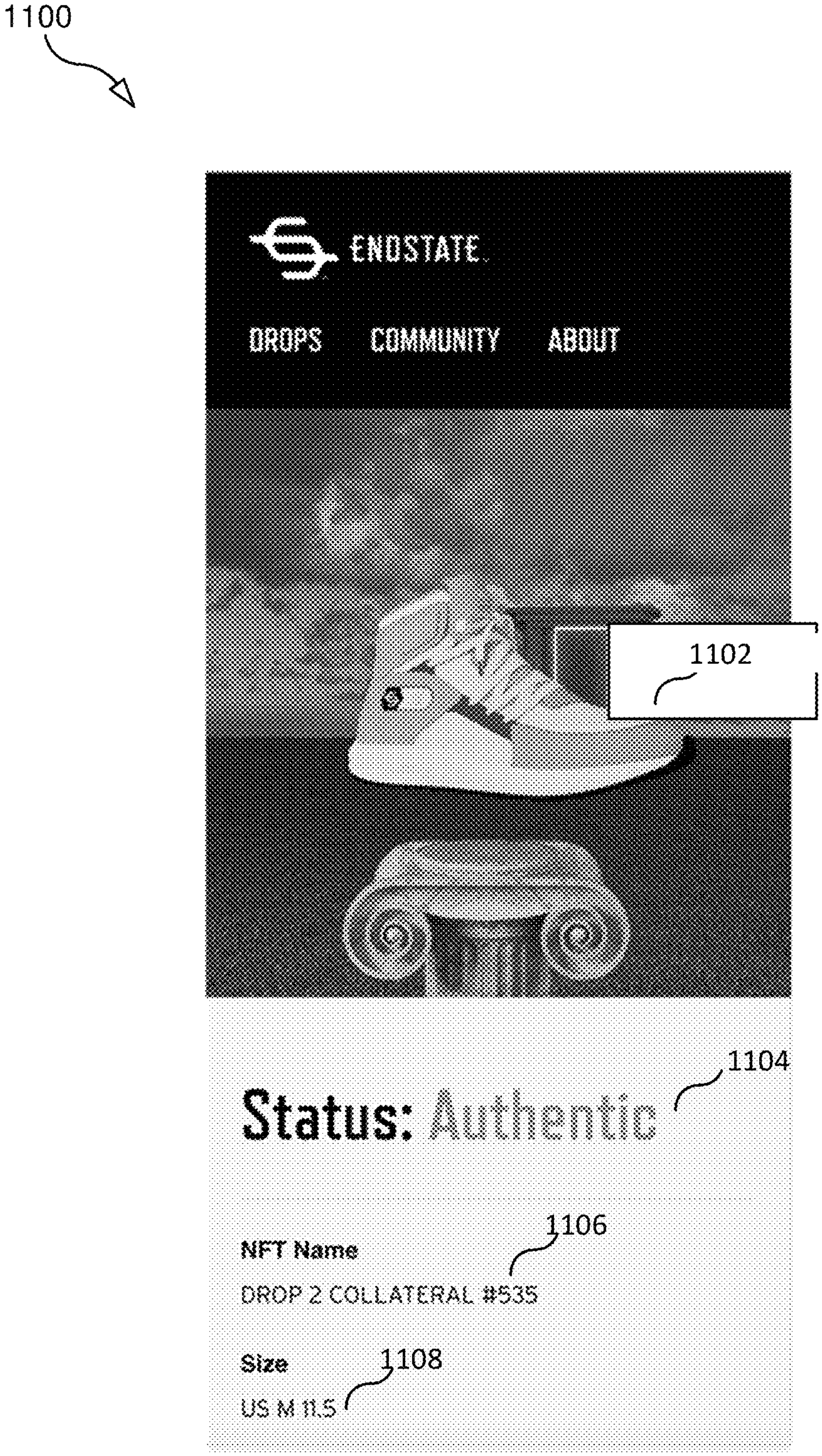
FIGS. 11A and 11B illustrate a graphical display of a digital asset according to some embodiments.
Figure 11B:
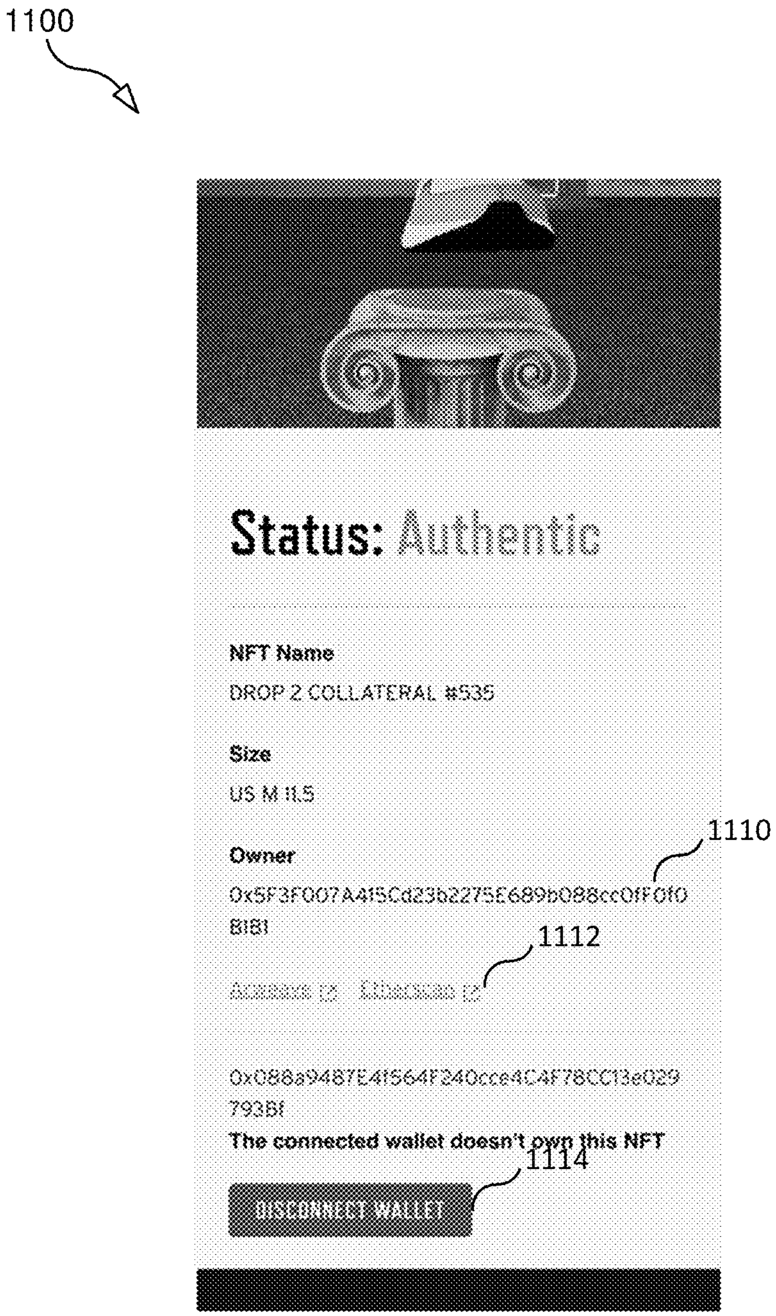

FIGS. 11A and 11B illustrate a graphical display of a digital asset according to some embodiments. Webpage 1100 illustrates the verification page. Webpage 1100 may include a visual display 1102 of the digital asset. Webpage 1100 may also include a status 1104 of the digital asset, a name 1106 of the digital asset, a description 1008 (e.g., size) of the related physical object, the owner 1110 of the digital asset, a link 1112 to a blockchain, and a button 1114 to disconnect the user's wallet. In the present embodiment, the connected wallet does not own the digital asset.

Referring back to FIG. 9, if the digital asset has not been claimed, process 900 may proceed to step 912. At 912, the API may redirect the user to a claim page with a token claim. In the event that the digital asset is not yet claimed, the verification service may redirect the user to a web page with instructions and functionality to claim the digital asset. With this redirect request may be an encrypted token which contains information about the digital asset tokenId being claimed, the collection that the digital asset is associated with, and the expiration time. The expiration time prevents malicious scans by forcing users to complete the claim within a certain time frame. In some embodiments, this expiration is 10 minutes from when the token is created. The claim flow is a specific function of the site or application which guides the user through the process of connecting their crypto wallet or creating one. Then the user confirms the wallet is correct and begins the process of transferring the digital asset from the custodial wallet to the user's own wallet.

Figure 12:
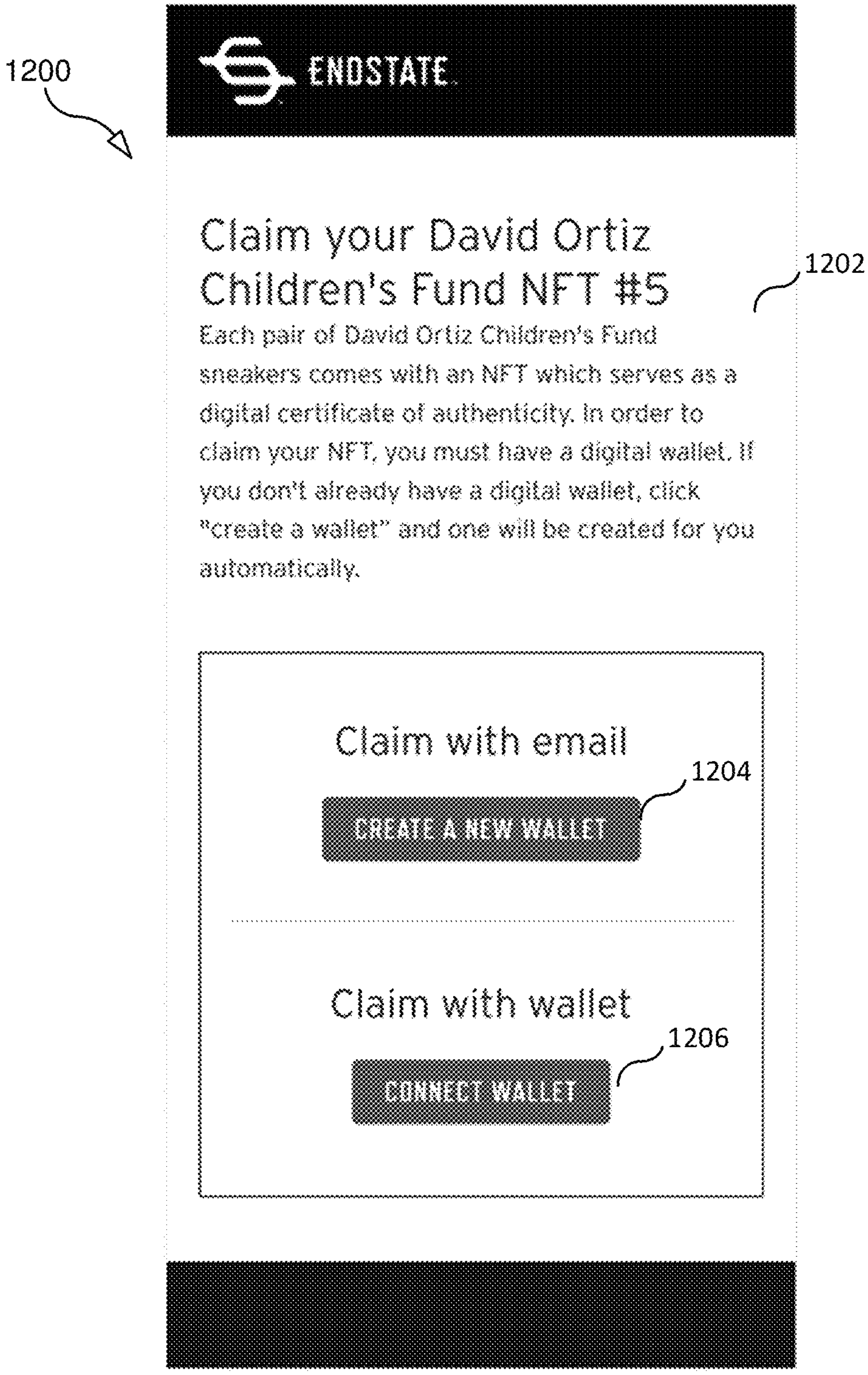
FIG. 12 illustrates a graphical display for claiming a digital asset according to some embodiments.

FIG. 12 illustrates a graphical display for claiming a digital asset according to some embodiments. A user may use graphical display 1200 to claim the digital asset. Graphical display 1200 may include a description 1202 of the digital asset, a link 1204 to create a crypto wallet, and a link to connect a crypto wallet. After the user has either created a wallet or connect a wallet, the user may move to graphical display 1300.

Figure 13:
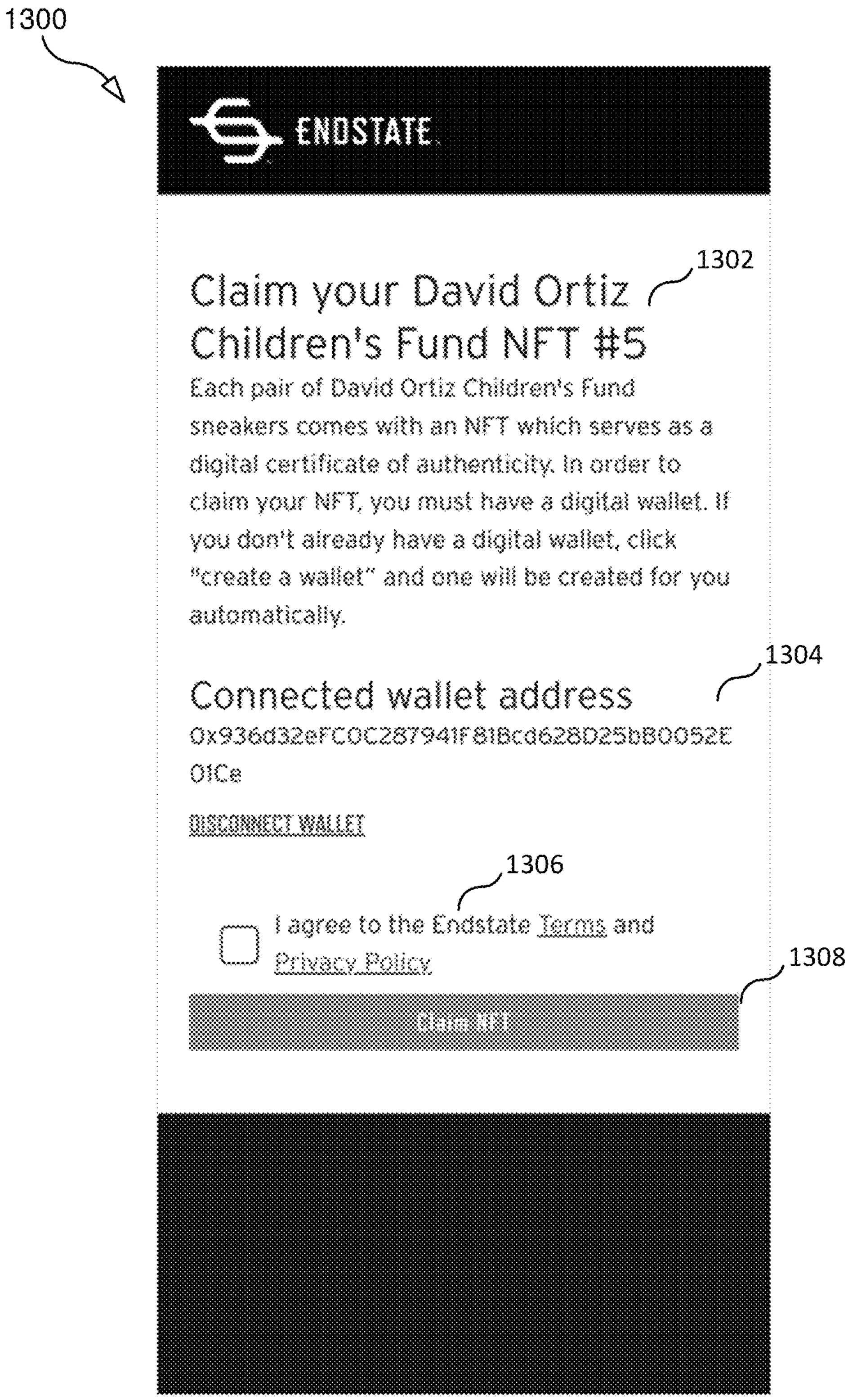
FIG. 13 illustrates a graphical display for claiming a digital asset according to some embodiments.

FIG. 13 illustrates a graphical display for claiming a digital asset according to some embodiments. Graphical display 1300 may include a description 1302 of the digital asset, the connected wallet's address 1304, a terms of service 1306, and a button 1308 to claim the digital asset.

When a digital asset is unclaimed the user may be directed to the claim flow with an encrypted web token of the digital asset to be claimed. This web token may contain information about the specific digital asset, the collection the digital asset belongs to, how long the user has to complete the claim flow before the token expires, and where the user should be redirected to if they successfully claim the digital asset.

The contents of this encrypted web token may include:

The digital asset token ID

The digital asset name or drop name

The token expiration date

The success URL redirect

This URL is a verification URL that is generated using the digital asset id and the drop data. On claimed digital assets, this is where the scan would normally go. The intention here is to give a place for the user to go to view their digital asset once the claim has been successful.

In some embodiments, the encrypted web token may also include the NFC chip serial number.

In some embodiments, the user is not able to claim the digital asset unless it is confirmed they have purchased the corresponding item. Confirmation of sale may be done by integrating with a point of sale system, or ecommerce system.

At 914, the user may connect their crypto wallet to the claim page. Once a crypto wallet has been connected, the user may confirm this is an irreversible transaction by accepting the terms before pressing the claim button to proceed. On the claim flow page, the user may provide a blockchain-based public key wallet address to which the digital asset may be transferred. They may do this by connecting a wallet through a web browser plug-in such as MetaMask or My Ether Wallet (MEW) or by authenticating with a third party wallet provider such as Magic.Link.

At 916, the API may request to claim the digital asset to the connected wallet. To process the transfer of the digital asset once a wallet has been connected, the site or application may makes a request to a backend API with the encrypted web token and with the connected wallet address. The digital asset will be claimed to this provided address.

At 918, process 900 may determine whether the claim token is valid. In some embodiments, the web token will have a limited validity time period. If the user took longer to complete the transaction than the web token's validity time period, then the claim flow will time out and the user will need to re-identify (i.e. re-scan) the physical object to obtain a new encrypted web token and start the process over. On the backend, the claim token may be decrypted and the expiration time may be checked.

If the claim token is valid, process 900 may proceed to step 920. At 920, the digital asset may be transferred to the provided wallet address. If the token is authenticated, the information about the digital asset may be used to process the claim request. The information may include the digital asset token id and the drop name to prevent a malicious user from injecting a different token ID when they submit the request along with their wallet address.

A blockchain transaction may be created and submitted to the blockchain. This transaction may include a claimTo or a transferFrom function call which will change ownership of the digital wallet from the custodial wallet to the provided wallet address.

transferFrom is a smart contract function defined in ERC 721 smart contract which transfers an NFT from one address to another.

claimTo a smart contract function which allows a safe transfer from a pre-specified custodial wallet to a target wallet address.

Below is the claimTo function which is a smart contracts used to enable digital assets claiming. This function is called by the API using the private key of the deployer address to sign the transaction and submit it to the blockchain. The function parameters are userWallet and tokenId, these are the destination wallet address and the digital asset token Id being claimed respectively. This function is a wrapper around safeTransferFrom which uses the custodial wallet address as the source. This is to prevent transfers of digital assets that have already been claimed.

```
function claimTo(
  address _userWallet,
  uint256 _tokenId
) public {
  safeTransferFrom(CustodialWalletAddress, _userWallet, _tokenId);
}
```

Typescript Function to Call claimTo Programmatically

This function is a Typescript implementation that uses the provided information to call the claimTo function on the smart contract. Given the smart contract, the digital asset token id, the destination wallet address, the URL of the blockchain to submit the transaction (this determines if the transaction is destined for Ethereum, Polygon, or either chain's staging environment), and finally the private key of the signer wallet, which is usually the custodial wallet. Once submitted to the blockchain, the transaction hash is returned so that the front end will be able to periodically check the status of the transaction.

```
const claimNFT = async (
  contract: any,
  tokenId: number,
  toWalletAddress: string,
  rpcUrl: string,
  signerPk: string
) => {
  const claimToTxn = contract.contract.methods.claimTo(
    toWalletAddress,
    tokenId
  );
  const result = await ethTransactionSend({
    nftContractAddress: contract.address,
    transaction: claimToTxn,
    signerPk,
    rpcUrl,
  });
  return result.transactionHash;
};
```

At 922, the user may be shown that the transfer is complete and prompt the user to navigate to the verification page. Once the transaction is submitted to the blockchain, the transaction hash is returned to the front end web page or application so that the status of the transaction can be checked at a set interval. The web page will use the transaction hash to request the status of the transaction on the blockchain. When the blockchain confirms the transaction has been written successfully, a success message is shown to the user and an option to view the claimed NFT is presented.

If the claim token is not valid, process 900 may proceed to step 924. At 924, the API may communicate with the user that the token is invalid and prompt the user to scan the shoe again.

Figure 10:
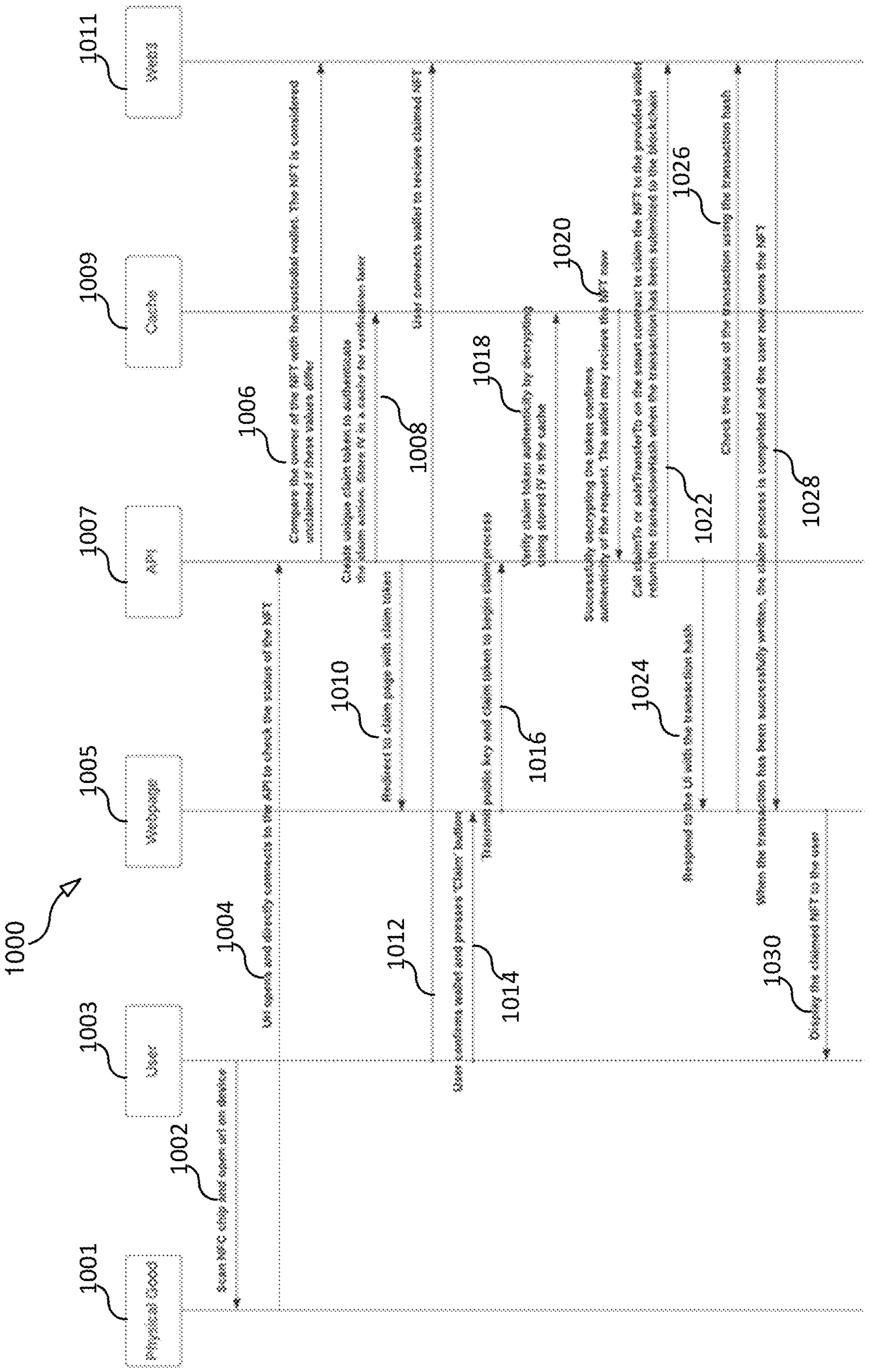
FIG. 10 is a sequence diagram illustrating a method for claiming a digital asset linked with a NFC chip according to some embodiments.

FIG. 10 is a sequence diagram illustrating a method for claiming a digital asset linked with a NFC chip according to some embodiments. Method 100 may begin at step 1002.

At 1002, a user 1003 may scan an NFC chip of a physical good 1001. By scanning the NFC chip, a URL may open on user 1003 device. The URL opens and directly connects to an API 1007 to check the status of the digital asset linked to the NFC chip.

At 1006, API 1007 may compare the owner of the digital asset with the custodial wallet with web3 1011. Web 3 1011 being a blockchain. A blockchain is a system of recording transaction in a peer-to-peer digital ledger. In some embodiments, the blockchain may include Ethereum Virtual Machine, or EVM, is the base technology which powers multiple different blockchains and enables functionality such as managing state and smart contracts.

At 1008, API 1007 may create a unique claim token to authenticate the claim action. API 1007 may store the token in a cache 1009 for later verification. Cache 1009 may be a web service running in the cloud alongside the API and may be used for storing temporary and non-permanent values. API 1007 may then redirect user 1003 to a webpage 1005 displaying a claim page with the claim token. Webpage 1005 may be displayed on user's 1003 computing device. At 1012, user 1012 may connect their crypto wallet with web3 1011 to receive the claim digital asset.

At 1014, user 1003 may confirm their wallet and press a "claim" button on webpage 1005. Webpage 1005 may then transmit a public key and claim token to API 1007 to begin the claim process at 1016. At 1018, API 1007 may verify the received claim token authenticity by decrypting the claim token using the version stored in cache 1009. API 1007 may successfully decrypt the token and confirm the authenticity of the request at 1020. At this point, the wallet of the user may receive the digital asset.

At 1022, API 1007 may submit a function to web3 1011 to transfer ownership of the digital asset to user's 1003 wallet. In some embodiments, API 1007 may call claimTo or safeTransferFrom on the smart contract to claim the digital asset to the provided wallet and may return the transactionHash when the transaction has been submitted to the blockchain.

At 1024, API 1007 may respond to webpage 1005 with the UI and the transaction hash. At 1026, webpage 1005 may check the status of the transaction using the transaction hash with web3 1011. Web3 1011 may respond when the transaction has been successfully written, the claim process is completed, and the user now owns the NFT at 1028. At 1030, webpage 1005 may display the claimed digital asset to user 1003.

Figure 14:
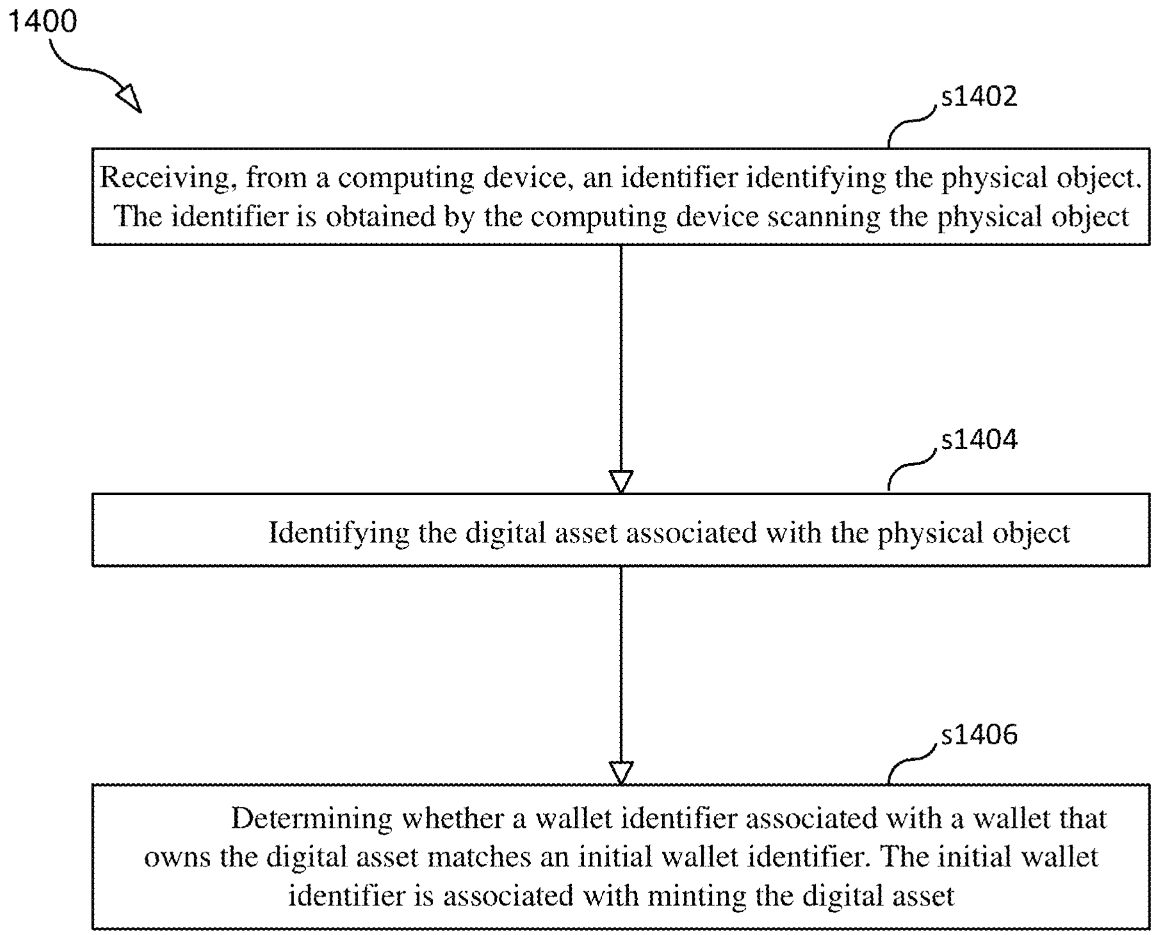
FIG. 14 is a flow chart illustrating a process according to some embodiments.

FIG. 14 is a flow chart illustrating a process according to some embodiments.

Process 1400 is a computer-implemented method for claiming a digital asset linked with a physical object. Referring now to FIG. 14, process 1400 may begin with step s1402.

Step s1402 comprises receiving, from a computing device, an identifier identifying the physical object, wherein the identifier is obtained by the computing device scanning the physical object.

Step s1404 comprises identifying the digital asset associated with the physical object.

Step s1406 comprises determining whether a wallet identifier associated with a wallet that owns the digital asset matches an initial wallet identifier, wherein the initial wallet identifier is associated with minting the digital asset.

In some embodiments, the physical object includes a near-field communication (NFC) chip and the identifier is obtained by the computing device scanning the NFC chip of the physical object.

In some embodiments, the method includes as a result of determining the wallet identifier associated with the digital asset does not match the initial wallet identifier, directing a user of the computing device to a verification webpage; receiving a user wallet identifier; and determining whether the user wallet identifier matches the wallet identifier associated with a wallet that owns the digital asset.

In some embodiments, the method includes as a result of determining the wallet identifier associated with the digital asset matches the initial wallet identifier, obtaining an encrypted token; and transmitting the encrypted token to the computing device.

In some embodiments, the encrypted token comprises one or more of: a digital asset identifier associated with the digital asset, a group identifier associated with the digital asset, and a time identifier.

In some embodiments, the encrypted token comprises a success uniform resource locator (url) redirect and/or a NFC chip serial number associated with the physical object.

In some embodiments, the method includes receiving a claiming message. The claiming message comprises a key associated with a wallet and the encrypted token.

In some embodiments, the method includes determining the time identifier has not expired; and transferring the digital asset to the wallet of the user.

In some embodiments, the method includes receiving a payment identifier associated with the physical object.

In some embodiments, the digital asset is transferred after receiving the payment identifier.

In some embodiments, the digital asset includes a cryptographic token.

In some embodiments, the cryptographic token is a non-fungible token (NFT).

Granting Access

In some embodiments, users may be granted access to online and in-person perks if they prove they own a digital asset and/or the corresponding physical item belonging to a specific drop. Drops may refer to a collection of discrete products, sometimes created with limited quantities and usually only available for a short time frame. The users may have to prove they own the physical good or the digital asset. In some embodiments, the users will have to prove that they own both the physical good and the corresponding digital asset.

To prove they own an authentic digital asset, users may have to connect a digital wallet or hardware wallet to a verification webpage or mobile application containing the relevant digital asset.

For web pages with crypto wallet capabilities, the user may connect the wallet with a crypto wallet browser extension which will give the webpage access to the public key of the user's wallet. The public key may be compared against the owner of the relevant digital asset. If the two wallet addresses are the same, the user proves they owns the digital asset and their ownership is verified.

For mobile application users, or users on web pages without crypto wallet capabilities, a secure, one-to-one, connection may be made between the mobile application and a desktop computer based browser with a connected crypto wallet.

Figure 15:
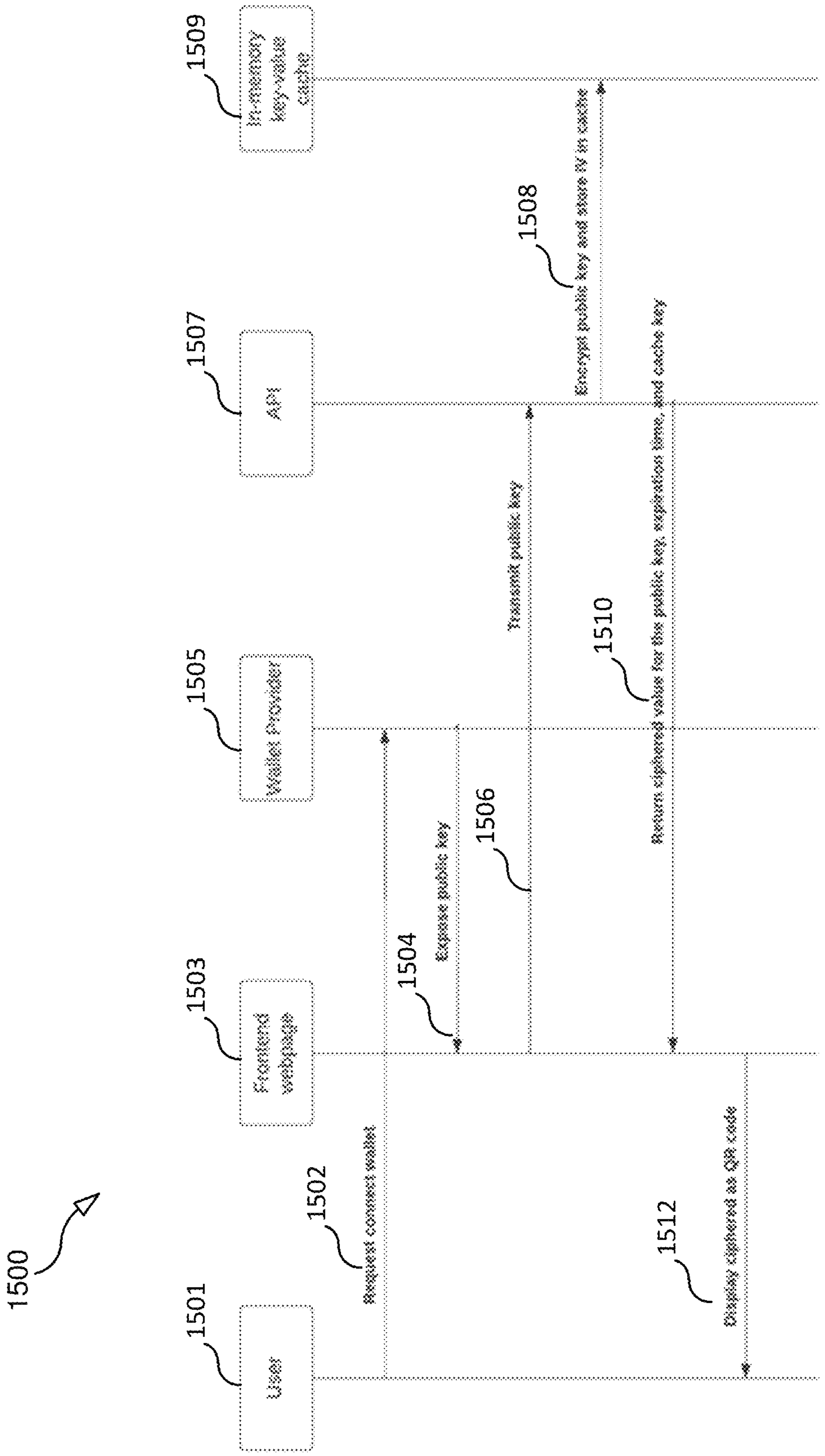
FIG. 15 is a sequence diagram illustrating a method for granting access according to some embodiments.

FIG. 15 is a sequence diagram illustrating a method for granting access according to some embodiments. The user first scans their NFC chip to obtain information associated with the connected digital asset. This will read the digital asset number and Drop ID from the blockchain and display it to the user. Method 1500 may begin with step 1502.

At 1502, a user 1501 may request to connect their wallet with a wallet provider 1505. User 1501 may be a person who owns both the digital NFT and the physical product and is attempting to verify that ownership.

At 1504, wallet provider 1505 may expose a public key of a wallet to a frontend webpage 1503. Frontend webpage 1503 may transmit the public key to an API 1507. Frontend webpage 1503 may have crypto capabilities. Once connected, webpage 1503 may use the wallet's public key to generate a unique QR code with the wallet public key encoded in the image.

At 1508, API 1507 may encrypt the public key and store an initialization vector of the encryption in a cache 1509. Cache 1509 may be data store such as Redis which can store data as a key-value pair with expiration. The API encrypts the public key into a token with an expiration time and a unique identifier key. The initialization vector of the encrypted token may inserted into cache 1509 with the same expiration time and the corresponding wallet public key. After the expiration has passed, the initialization vector will be erased rendering the encrypted token useless.

At 1510, API 1507 may return a ciphered value for the public key, expiration time, and cache key to frontend webpage 1503. Frontend webpage 1503 may display the ciphered to user 1501 as a QR code. The QR code to be read by a mobile device's camera.

Figure 16:
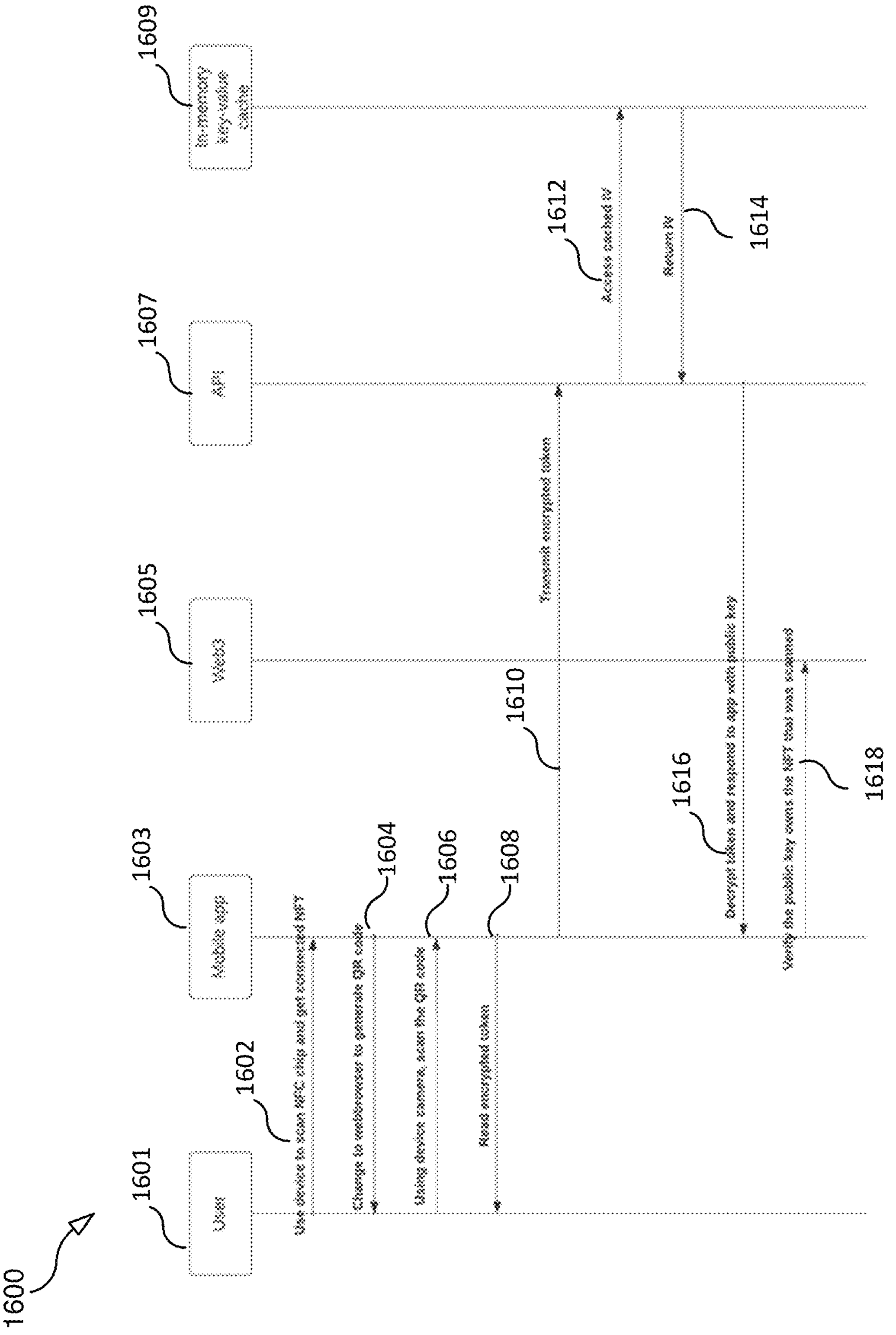
FIG. 16 is a sequence diagram illustrating a method for granting access according to some embodiments.

FIG. 16 is a sequence diagram illustrating a method for granting access according to some embodiments. Method 600 may begin with step 1602.

At 1602, a user 1601 may use a computing device to scan an NFC chip and connect with a digital asset with a mobile application 1603. Mobile application 1603 may change to a web browser to generate a QR code at 1604. At 1606, user 1601 may scan the QR code using a device camera. In response, the mobile application may read the encrypted token at 1608 and transmit the encrypted token to API 1607 at 1610.

At 1612, API 1607 may access the initialization vector of the token from cache 1609 which may return the initialization vector to API 1607 at 1614. At 1616, API 1607 may decrypt the token and response to the mobile application with the public key.

API 1607 may decrypt the token to retrieve the public key, expiration time, and unique cache key. In some embodiments, if the token fails to be decrypted, possibly because the token was malformed or inauthentic, the request is rejected. If the token is decrypted but the expiration time has passed, the request is rejected. If the unique key is not present in the in-memory cache 1609, because of a reset or the time-to-live has expired, the request is rejected. If all checks succeed, API 1607 will pass back to the mobile app the now unencrypted public key. Once the app has the unencrypted public key, it will be able to verify the ownership of the scanned digital asset by comparing the connected public key with the wallet address of the owner of the scanned digital asset.

At 1618, mobile application 1603 may verify the public key owns the digital asset that was scanned with Web3 1605. The user may then be admitted to the token-gated space or event (either physical or digital) now that the ownership of the digital good has been authenticated.

In some embodiments, to verify ownership of an authentic physical item, users may scan the embedded or attached NFC chip with an NFC enabled device such as an android or apple phone. For products with encrypted NFC chips, the webpage opening may be enough to validate authentication as the process for creating these NFC chips is protected and cannot be replicated. For unencrypted NFC chips, the user may need to connect and prove ownership of the digital component to truly prove ownership.

Scanning the physical item may take the user to the verification page or mobile application for the associated digital asset. On this page, the user may connect the wallet that owns the associated digital asset, either by connecting their own wallet or signing in with a third party wallet provider to prove their ownership of the digital asset.

Identifying the physical item and connecting a digital or hardware wallet together creates a combined digital/physical identity that will allow the user to participate in online digital experiences and in-person physical experiences that are unique to authenticated users.

Figure 17:
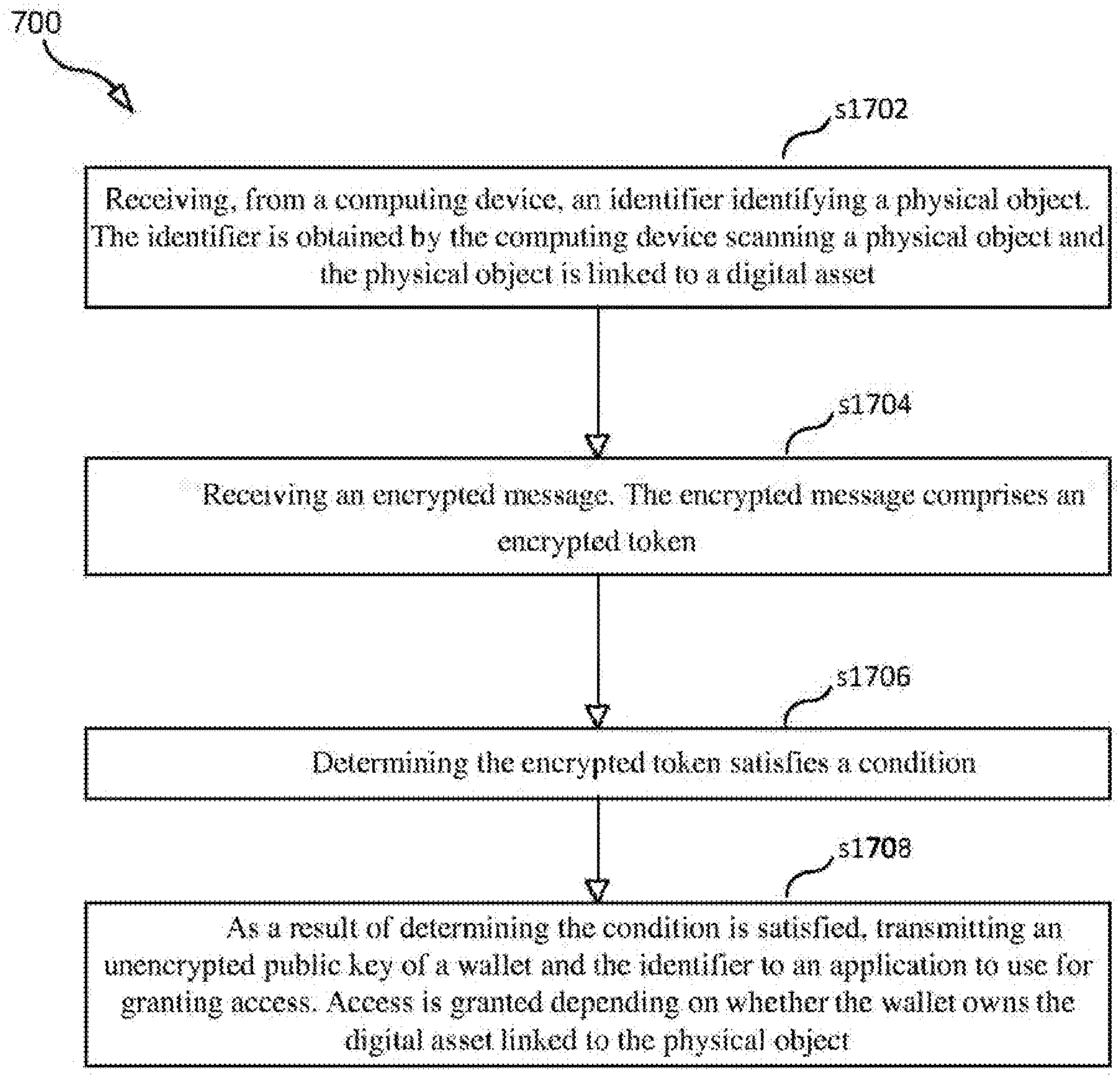
FIG. 17 is a flow chart illustrating a process according to some embodiments.

FIG. 17 is a flow chart illustrating a process according to some embodiments.

Process 1700 is a computer-implemented method for granting access. Referring now to FIG. 17, process 1700 may begin with step s1702.

Step s1702 comprises receiving, from a computing device, an identifier identifying a physical object. The identifier is obtained by the computing device scanning a physical object and the physical object is linked to a digital asset.

Step s1704 comprises receiving an encrypted message, wherein the encrypted message comprises an encrypted token.

Step s1706 comprises determining the encrypted token satisfies a condition. Step s1708 comprises as a result of determining the condition is satisfied, transmitting an unencrypted public key of a wallet and the identifier to an application to use for granting access, wherein access is granted depending on whether the wallet owns the digital asset linked to the physical object.

In some embodiments, the physical object includes a near-field communication (NFC) chip and the identifier is obtained by the computing device scanning the NFC chip of the physical object.

In some embodiments, determining the encrypted token satisfies the condition comprises: determining that the encrypted token is able to be decrypted; or determining a time identifier associated with the encrypted token has not expired.

In some embodiments, the method includes receiving a key message, wherein the key message includes the public key; encrypting the public key into the encrypted token, wherein the encrypted token comprises a time identifier and an unique identifier key; and storing an initialization vector of the encrypted token into a memory cache.

In some embodiments, the method includes transmitting the encrypted token to a browser, wherein the encrypted token is displayed to a user as a QR code.

In some embodiments, the encrypted message is received as a result of the user scanning the QR code.

In some embodiments, access is granted depending on ownership of the physical object.

Figure 18:
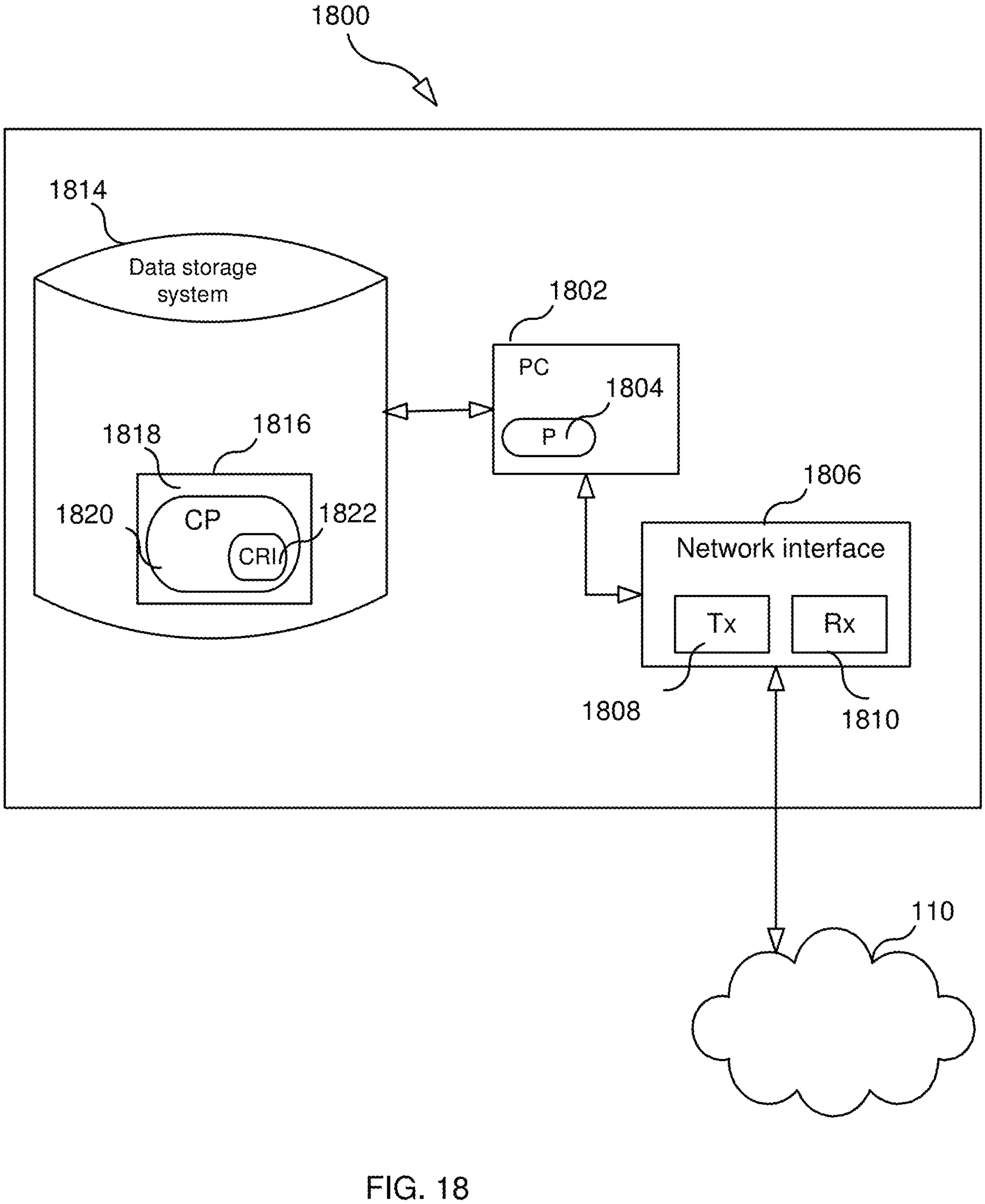
FIG. 18 is a block diagram of an apparatus according to some embodiments.

FIG. 18 is a block diagram of an apparatus 1800, according to some embodiments. As shown in FIG. 18, the apparatus may comprise: processing circuitry (PC) 1802, which may include one or more processors (P) 1855 (e.g., a general purpose microprocessor and/or one or more other processors, such as an application specific integrated circuit (ASIC), field-programmable gate arrays (FPGAs), and the like); a network interface 1848 comprising a transmitter (Tx) 1845 and a receiver (Rx) 1847 for enabling the apparatus to transmit data to and receive data from other computing devices connected to a network 1810 (e.g., an Internet Protocol (IP) network) to which network interface 1848 is connected; and a local storage unit (a.k.a., "data storage system") 1808, which may include one or more non-volatile storage devices and/or one or more volatile storage devices. In embodiments where PC 1802 includes a programmable processor, a computer program product (CPP) 1841 may be provided. CPP 1841 includes a computer readable medium (CRM) 1842 storing a computer program (CP) 1843 comprising computer readable instructions (CRI) 1844. CRM 1842 may be a non-transitory computer readable medium, such as, magnetic media (e.g., a hard disk), optical media, memory devices (e.g., random access memory, flash memory), and the like.

In some embodiments, apparatus 1800 may comprise and/or perform the functions any of the computing device, APIs, and objects described in FIGS. 1-12. In some embodiments, the CRI 1844 of computer program 1843 is configured such that when executed by PC 1802, the CRI 1844 causes the apparatus 1800 to perform steps/functions described herein (e.g., steps/functions described herein with reference to FIGS. 2-17). In other embodiments, the apparatus 1800 may be configured to perform steps/functions described herein without the need for code. That is, for example, PC 1802 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A computer-implemented method for granting access by identifying a physical object and connecting a digital wallet of a user and the physical object together to create a combined digital/physical identity, the method comprising:

receiving, from a computing device, an identifier identifying the physical object, wherein the identifier is obtained by the computing device scanning the physical object and wherein the physical object is linked to a digital asset;

receiving an encrypted message, wherein the encrypted message comprises an encrypted token;

determining the encrypted token satisfies a condition, wherein determining the encrypted token satisfies the condition includes determining that the encrypted token is able to be decrypted and determining a time identifier associated with the encrypted token has not expired, wherein, as a result of determining the condition is satisfied, transmitting an unencrypted public key of the digital wallet of the user and the identifier to an application to use for granting access to an authenticated user, wherein granting access is based on whether the digital wallet owns the digital asset linked to the physical object and if the digital wallet owns the digital asset linked to the physical object: and granting access to one or more of: an online digital experience or an in-person physical experience unique to authenticated users if the digital wallet owns the digital asset linked to the physical object.

2. The computer-implemented method according to claim 1, wherein the physical object includes a near-field communication (NFC) chip and the identifier is obtained by the computing device scanning the NFC chip of the physical object.

3. The computer-implemented method according to claim 1, further comprising:
receiving a key message, wherein the key message includes the public key;
encrypting the public key into the encrypted token, wherein the encrypted token comprises a time identifier and a unique identifier key; and
storing an initialization vector of the encrypted token into a memory cache, wherein encrypting the public key into the encrypted token includes applying a symmetric encryption algorithm using the initialization vector and embedding the time identifier within the encrypted token.

4. The computer-implemented method according to claim 3, further comprising:
transmitting the encrypted token to a browser, wherein the encrypted token is displayed to a user as a QR code.

5. The computer-implemented method according to claim 4, wherein the encrypted message is received as a result of the user scanning the QR code.

6. A computer program product comprising a non-transitory computer readable medium storing a computer program comprising instructions which, when executed by processing circuitry, causes the processing circuitry to carry out the method of claim 1.

7. A computing device, comprising:
processing circuitry;
a memory containing instructions executable by the processing circuitry for granting access, the computing device is operative to:
receive, from a computing device, an identifier identifying the physical object, wherein the identifier is obtained by the computing device scanning the physical object and the physical object is linked to a digital asset;
receive an encrypted message, wherein the encrypted message comprises an encrypted token; and
determine the encrypted token satisfies a condition, wherein as a result of determining the encrypted token satisfies the condition that the encrypted token is able to be decrypted and there is a time identifier associated with the encrypted token that has not expired, and then transmit an unencrypted public key of the digital wallet and the identifier to an application to use for granting access to an authenticated user, wherein access is granted, depending on whether the digital wallet owns the digital asset linked to the physical object, to provide one or more of: an online digital experience or an in-person physical experience unique to authenticated users.

8. The computer-implemented method according to claim 1, wherein the in-person physical experience requires presentation of both the physical obiect and ownership of the digital asset linked to the physical object.

9. The computing device according to claim 7, wherein the physical object includes a near-field communication (NFC) chip and the identifier is obtained by the computing device scanning the NFC chip of the physical object.

10. The computing device according to claim 7, wherein determining the encrypted token satisfies the condition comprises determining that the encrypted token satisfies the condition, decrypting the encrypted token using an initialization vector and determining that the time identifier included in the encrypted token has not expired.

11. The computing device according to claim 7, the computing device operative to:
receiving a key message, wherein the key message includes the public key;
encrypting the public key into the encrypted token, wherein the encrypted token comprises a time identifier and a unique identifier key; and
storing an initialization vector of the encrypted token into a memory cache wherein encrypting the public key into the encrypted token includes applying a symmetric encryption algorithm using the initialization vector and embedding the time identifier within the encrypted token.

12. The computing device according to claim 11, the computing device operative to:
transmitting the encrypted token to a browser, wherein the encrypted token is displayed to a user as a QR code.

13. The computing device according to claim 12, wherein the encrypted message is received as a result of the user scanning the QR code.

14. An apparatus for granting access by identifying a physical object and connecting a digital wallet of a user and the physical object together to create a combined digital/physical identity, the apparatus comprising:
a memory;
processing circuitry coupled to the memory, wherein the apparatus is configured to:
receive, from a computing device, an identifier identifying the physical object, wherein the identifier is obtained by the computing device scanning the physical object and the physical object is linked to a digital asset,
receive an encrypted message, wherein the encrypted message comprises an encrypted token;
determine the encrypted token satisfies a condition that the encrypted token is able to be decrypted and a time identifier associated with the encrypted token has not expired; and
as a result of determining the condition is satisfied, transmit an unencrypted public key of the digital wallet and the identifier to an application to use for granting access to an authenticated user, wherein access is granted based on whether the digital wallet owns the digital asset linked to the physical object.

* * * * *